United States Patent
Yin et al.

(10) Patent No.: US 11,531,710 B2
(45) Date of Patent: Dec. 20, 2022

(54) SYSTEM AND METHOD OF GRAPH FEATURE EXTRACTION BASED ON ADJACENCY MATRIX

(71) Applicant: Zhejiang University, Hangzhou (CN)

(72) Inventors: Jianwei Yin, Hangzhou (CN); Zhiling Luo, Hangzhou (CN); Zhaohui Wu, Hangzhou (CN); Shuiguang Deng, Hangzhou (CN); Ying Li, Hangzhou (CN); Jian Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 584 days.

(21) Appl. No.: 16/697,159

(22) Filed: Nov. 26, 2019

(65) Prior Publication Data

US 2020/0110777 A1 Apr. 9, 2020

Related U.S. Application Data

(63) Continuation of application No. PCT/CN2018/082112, filed on Apr. 8, 2018.

(51) Int. Cl.
*G06F 16/90* (2019.01)
*G06F 16/9038* (2019.01)
(Continued)

(52) U.S. Cl.
CPC ...... *G06F 16/9038* (2019.01); *G06F 16/9024* (2019.01); *G06K 9/6261* (2013.01);
(Continued)

(58) Field of Classification Search
CPC .. G06F 16/9038; G06F 16/9024; G06F 17/16; G06K 9/6261; G06K 9/6276; G06N 3/04; G06N 3/08
See application file for complete search history.

(56) References Cited

U.S. PATENT DOCUMENTS

2013/0144818 A1* 6/2013 Jebara ............... G06Q 50/00 706/12
2019/0095806 A1* 3/2019 Martinez Canedo .. G06Q 10/04
(Continued)

FOREIGN PATENT DOCUMENTS

CN 104951442 A 9/2015
CN 106897739 A 6/2017
(Continued)

OTHER PUBLICATIONS

Mathias Nipert et al. "Learning Convolution Neural Networks for Graphs," Proceedings of the 33rd International Conference on Machine Learning, New York, NY, USA, 2016, Jun. 8, 2016.
(Continued)

*Primary Examiner* — Fayyaz Alam

(57) ABSTRACT

A method and system of graph feature extraction and graph classification based on adjacency matrix is provided. The invention first concentrates the connection information elements in the adjacency matrix into a specific diagonal region of the adjacency matrix which reduces the non-connection information elements in advance. Then the subgraph structure of the graph is further extracted along the diagonal direction using the filter matrix. Further, it uses a stacked convolutional neural network to extract a larger subgraph structure. On one hand, it greatly reduces the amount of computation and complexity, getting rid of the limitations caused by computational complexity and window size. On the other hand, it can capture large subgraph structure through a small window, as well as deep features from the implicit correlation structures at both vertex and edge level, which improves speed and accuracy of graph classification.

20 Claims, 18 Drawing Sheets

(51) Int. Cl.
*G06F 16/901* (2019.01)
*G06K 9/62* (2022.01)
*G06N 3/04* (2006.01)
*G06N 3/08* (2006.01)
*G06F 17/16* (2006.01)

(52) U.S. Cl.
CPC ............. *G06K 9/6276* (2013.01); *G06N 3/04* (2013.01); *G06N 3/08* (2013.01); *G06F 17/16* (2013.01)

(56) References Cited

U.S. PATENT DOCUMENTS

2019/0130264 A1* 5/2019 Rossi .................... G06K 9/6232
2021/0165852 A1* 6/2021 Granger ............. G06V 10/7635

FOREIGN PATENT DOCUMENTS

| CN | 108062551 A | * | 5/2018 | ........... G06K 9/4604 |
| CN | 108520275 A | * | 9/2018 | ........... G06K 9/6256 |

OTHER PUBLICATIONS

International Search Report corresponding to PCT application (PCT/CN2018/082112).

* cited by examiner

FIG. 11
FIG. 12
First adjacency matrix
Second adjacency matrix
n (window size)
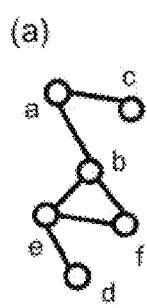
(a)
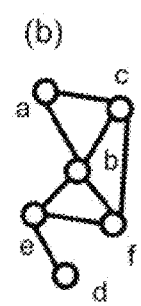
(b)
FIG. 13

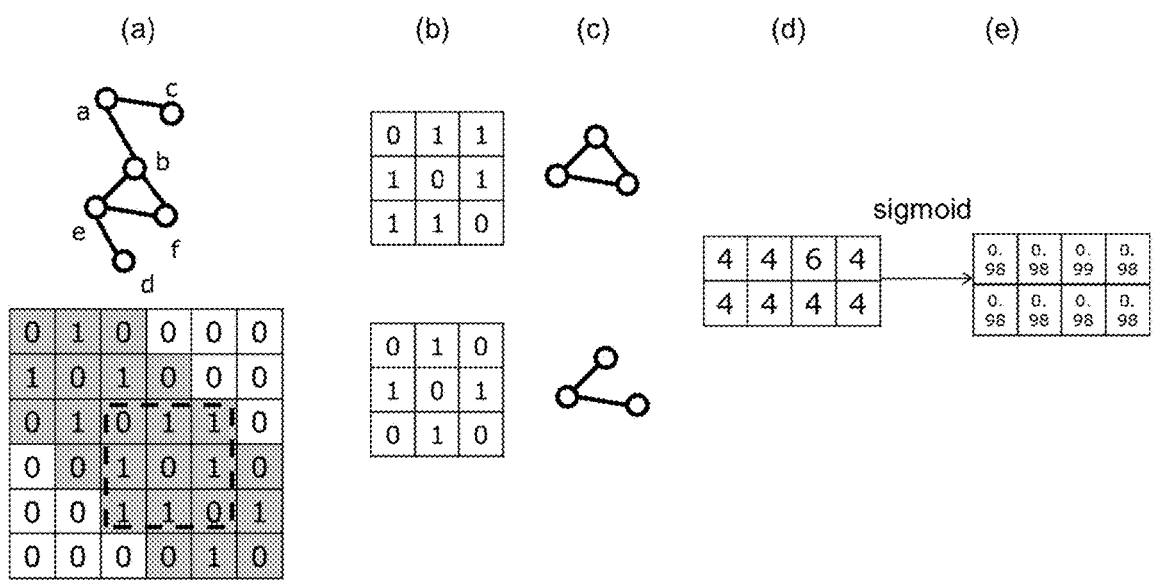
FIG. 14
FIG. 15
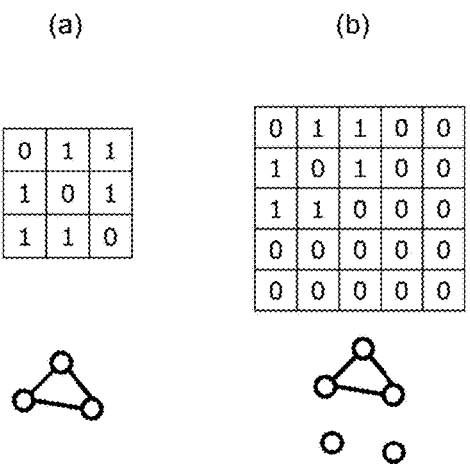
FIG 16

SYSTEM AND METHOD OF GRAPH FEATURE EXTRACTION BASED ON ADJACENCY MATRIX

CROSS-REFERENCE TO RELATED APPLICATIONS

This application is a continuation of and claims priority to International (PCT) Patent Application No. PCT/CN2018/082112, filed on Apr. 8, 2018, which claims foreign priority of Chinese Patent Application No. CN201710529418.5, filed on Jul. 1, 2017; CN201710510474.4, filed on Jun. 28, 2017; CN201710561961.3, filed on Jul. 11, 2017, in the China National Intellectual Property Administration. The disclosures of all of which are hereby incorporated by reference.

TECHNICAL FIELD

The present invention relates to artificial intelligence technology, especially to a system and method of graph feature extraction and graph classification based on adjacency matrix.

TECHNICAL BACKGROUND

In graph theory, a graph is a structure amounting to a set of objects in which some pairs of the objects are in some sense "related". The objects correspond to mathematical abstractions called vertices (also called nodes or points) and each of the related pairs of vertices is called an edge (also called an arc or line). In graph theory, a graph G is defined by (V, E) where V is the set of vertices and E is the set of edge. In simple terms, vertices represent objects and edges represent the relationships between objects. A graph is a type of non-grid data. The characteristic of this type of data is that in a specific scenario, the dimensions are uncertain, and the dimensions are high and have no upper bound. And the dimension of a graph refers to the number of vertices of the graph. For example, the chemical structure may can be represented as a graph in which atoms are vertices, and the chemical bonds between the atoms are edges. The dimension of a molecule is the number of atoms contained in the molecule. For example, if one molecule contains 100 atoms, the dimension of the molecule is 100. In a set of molecules, each molecule consists of an indefinite number of atoms, so its dimensions are uncertain. In reality, proteins and other complex structures often consist of tens or even hundreds of atoms, and their dimensions are as high as tens or even hundreds. For another example, a social network may also be represented as a graph, in which a person is a vertex, a person-to-person relationship is an edge between two vertices, and the dimension of a social network is higher and more complex, generally larger social networks can have thousands of vertices, tens of thousands of edges, and dimensions of up to several thousand. It can be seen that the dimensions of graphs in graph theory are very high and there is no upper bound.

Images, texts, audio, video or like belong to grid data. The characteristic of this type of data is that the dimensions are low (no more than 3 dimensions), and the dimensions are determined. For example, an image, with respect to a collection of images, the dimension of the image is not affected by the number of the image. For an image, its dimension can be 2D or 3D; while for more images (e.g. hundreds of images), the dimension of any individual image is a constant, and will still be 2D or 3D. It can be seen that grid data and non-grid data are two completely different data. Non-grid data has higher and uncertain dimensions and more complex structures than grid data. The classification methods and feature extraction methods for two kinds of data are completely different.

Many complex problems in business, science and engineering can be formulated as graph problems and solved by using graph analytic algorithms. The problem of classification of graphs treats graphs as complex objects and constructs deep learning models to learn classification of graphs based on common substructure patterns hidden in those graphs. For example, MUTAG dataset consists of many nitro compounds where class labels can indicate whether the compound has a mutagenic effect on a bacterium. Another example is mapping unseen compounds to their level of activity against cancer cells.

Conventional approaches to classification of complex objects, such as protein structures, social graphs, images, rely on designing adequate similarity function(s) to measure the similarity distance between two complex objects and then use the off-the-shelf classification algorithms. Based on graph-similarity computation models, existing approaches to classification of graphs can be broadly classified into two categories:

(1) The local subgraph based approaches compare graphs based on the existence or count of small substructures. The main challenge is to identify the significant subgraph structures as the signature features for classification of arbitrary graphs in the training set. Then by representing each graph as a feature vector with each element denoting the weight on the respective subgraph structure, existing off-the-shelf machine learning algorithms can be applied. A main problem with using such subgraph structures as signatures is the restriction of using very small subgraphs with a few nodes (window size of <10 nodes) due to the combinatorial complexity of subgraph enumeration for large window size. Consequently, these approaches fail to capture the complex structure patterns of graphs. This limitation can lead to high error ratio due to missing of the subgraph patterns that are critical to classification but cannot be captured by using the small window size.

(2) The global similarity-based approaches compute the pairwise similarity (distance) of graphs, typically by first encoding the subgraph features and then creating the distance matrix to record pairwise similarity for every pair of graphs, before employing the off-the-shelf supervised learning algorithms, e.g., kNN and SVM, on the distance matrix. Graph kernel and graph embedding are the two most recent representative methods in this category.

However, existing approaches in both categories suffer from some serious drawbacks. First, compared with classification of text, image, video and scene datasets, feature extractions for graphs pose some unique challenges. Graphs consist of two types of primitive elements: vertices and edges. Analyzing graphs as whole objects requires capturing not only the shallow features from explicit topological structure of a graph but also the deep features from the implicit (hidden) correlation structures at both vertex and edge level. Thus, it is difficult to represent graphs in a deterministic feature space. Second, capturing the implicit structural correlation patterns is critical for high quality classification of graphs. Neither small and fixed size of subgraph pattern matching (local) nor pairwise similarity of graphs (global) are sufficient for capturing the complex hidden correlation patterns for classification of graphs that have different size and different structural complexity.

Convolutional neural network (CNN) has achieved some noticeable success in deep learning over sequential data, e.g., text, image and grid data, video and stream data as well as large scale scene analysis. These data belong to the grid data, they have a definite dimension and the dimension is low, and the data in the grid data has the characteristics of translation, scaling, and rotation invariance. While graphs are non-grid data. Convolutional neural networks (CNNs) cannot be directly applied to graphs because the convolution and pooling operations in CNN are only defined in regular grid data and cannot be directly performed on non-grid data (Convolutional Neural Networks on Graphs with Fast Localized Spectral Filtering, 30th Conference on Neural Information Processing Systems (NIPS 2016), Barcelona, Spain, 1-8).

Mathias Niepert et al. is the first to apply CNN to classification of graph objects in a graph repository (Learning convolutional neural networks for graphs, Proceedings of the 33rd International Conference on Machine Learning, New York, N.Y., USA, 2016, 2014-2023). In the PSCN method proposed in the paper, for the input graph, the graph vertices are firstly labeled, and the vertices are sorted according to the labeling results. Then select the first w vertices and for each vertex perform a breadth-first search to obtain its neighborhood graph with receptive field size k. For each vertex, we can get a subgraph constructed by vertex itself and its k neighbors, so we can get w subgraphs. Through the above steps, we get w vectors with size k+1 and w vector with size $(k+1)^2$, which contains the vertex information and edge information of the corresponding subgraph respectively. And then we can perform a standard convolutional neural network on these vectors. Briefly, the PSCN extracts a subgraph with a specified size (determined by the window size parameter k) centered on several vertices (determined by the parameter w) as a feature, and then applies a standard one-dimensional convolutional neural network. PSCN achieves better results on the open datasets comparing with the Deep Graph Kernel. However, it still suffers from some drawbacks. First, the selection of neighborhood is determined by the window-size k, which is less than 10, because a larger window-size k will result in unacceptable running time and memory usage. Second, PSCN cannot perform deep learning effectively with the small window size k because they lose the complex subgraph features when some input graphs in the repository have the dense connectivity features that are beyond the pre-defined system default window size. Third, the classification results of PSCN are sensitive to the labeling approach, in which the nodes in neighborhood are ranked, since their labeling approach works on one dataset and may fail on another.

In summary, there are two main problems in the classification of graphs in the existing methods. First, when analyzing graphs as whole objects, it is hard to select the feature which contains both deep features from the implicit (hidden) correlation structures and the shallow features from explicit topological structure to represent a graph; second is that when the subgraph is used as a graph feature, the size of the subgraph is limited by the choice of the window size k, which makes it difficult to capture large complex subgraphs, making the graph Classification accuracy is not high.

However, when many scenes in real life are abstracted as graph, the subgraphs that contain representative features are usually more complex. Such as the compound in organic, the atoms are used as the vertices of the graph, the chemical bonds between the atoms are used as the edges, and it is usually necessary to use certain special molecular structures as the characteristics of the entire compound, and these characteristic molecular structures (i.e. subgraphs) may contain hundreds of atoms (i.e. vertices); for social networks, people in the network are the vertices, relationships with people are the edges, it is often necessary to use the network's special community structure (i.e. subgraphs) as a feature of the network. There may be hundreds of individuals (i.e. vertices) in this group structure. However, the existing methods cannot effectively extract the larger subgraph structure in the graph, and thus cannot perform a very good feature representation of the graph.

BRIEF SUMMARY OF THE INVENTION

The invention is to provide a system and method of graph feature extraction and graph classification based on adjacency matrix in a computer environment, which can effectively capture large-scale multi-vertex subgraph structure information. The invention solved the technical problems that cannot be solved by existing methods.

The existing graph classification methods have some drawbacks. First, analyzing graphs as whole objects requires capturing not only the shallow features from explicit topological structure of a graph but also the deep features from the implicit (hidden) correlation structures at both vertex and edge level. Otherwise, the accuracy of graph classification will be reduced. It is difficult for the existing methods to represent a graph in a deterministic feature space. The feature space refers to feature extraction from original data, and mapping the original data to a higher-dimensional space. Features in feature space are higher-dimensional abstractions of the original data. Second, due to the limitations of the computational complexity caused by the window size, the existing methods cannot capture large multi-vertex subgraph structures. Compared with the existing graph classification method, the present invention concentrates the connection information elements in the adjacency matrix into a specific diagonal region of the adjacency matrix. It reduces the non-connection information elements in advance. And then, the subgraph structure of the graph is further extracted along the diagonal direction using the filter matrix. After that, a stacked convolutional neural network is used to extract a larger subgraph structure. On the one hand, it greatly reduces the amount of computing and complexity, solving the limitation of the computational complexity and the limitation of window size. On the other hand, it can capture large subgraph structure through a small window, as well as deep features from the implicit correlation structures at both vertex and edge level, which improves the accuracy and speed of the graph classification.

The first purpose of the present invention is to provide a graph feature extraction system based on an adjacency matrix in a computer environment. The graph feature extraction system extracts graph features based on an adjacency matrix of the graph, and the features directly correspond to the subgraph which can be classified. The features are presented in the form of at least one vector. Each vector represents a distribution of a mixed state in the graph.

The second purpose of the present invention is to provide a graph classification system based on an adjacency matrix in a computer environment. The graph classification system comprises a class labeling module and graph feature extraction system describe above. The class labeling module classifies the graph based on the features extracted by the graph feature extraction system and outputs the class of the graph.

The third purpose of the present invention is to provide a graph feature extraction method based on an adjacency matrix in a computer environment. The method extracts features of a graph based on an adjacency matrix of the graph, and the features which directly correspond to the subgraph which can be classified. The features are presented in the form of at least one vector. Each vector represents a distribution of a mixed state in the graph.

The fourth purpose of the present invention is to provide a graph classification method based on an adjacency matrix in a computer environment.

The fifth purpose of the present invention is to provide three kinds of graph classification methods based on stacked CNN in a computer environment.

The sixth purpose of the present invention is to provide a graph classification system in which the vertex of the graph is an arbitrary entity, and the edge of the graph is a relationship between entities.

The seventh purpose of the present invention is to provide a network structure determination system which classifies network structure based on the graph classification system described above. The vertices of the graph are nodes in the network. The edge of the graph is the relationship of nodes in the network.

The eighth purpose of the present invention is to provide a compound classification system which classifies compound classification based on the graph classification system described above. The vertices of which are the atoms of the compound, and the edges of the graph the chemical bond between atoms.

The ninth purpose of the present invention is to provide a social network classification system which classifies social network based on any form of the graph classification system described above. The vertices of which are entities of social networks, comprising, but not limited to, person, institutions, events, geographic locations in social networks. The edges of the graph are relationships between entities, comprising, but not limited to, friends, follows, private letters, quotations, associations. The quotation may refer to a person who is mentioned, using the symbol @.

The tenth purpose of the present invention is to provide a computer system comprising any of graph feature extraction systems, graph classification system, the network structure classification system, the compound classification system, the social network classification system, or any of a plurality of types mentioned above.

This summary of the invention provides brief introduction of concepts which will be described in detail in the following description. This summary is not intended to identify key features or essential features of the claimed subject matter, nor is it intended to identify any scope of the claimed subject.

Compared with the existing methods, the benefits of the present invention are:

1. The present invention concentrates the connection information in the adjacency matrix into the diagonal region of the adjacency matrix, and further uses the filter matrix to extract the subgraph structure of the graph in the diagonal direction, greatly reducing the computational complexity. The graph feature extraction system with the connection information regularization module has a much smaller amount of computation than the graph feature extraction system without the module. The amount of computation can be reduced to 25% compared with latter. At the same time, the stacked CNN is used for feature extraction to capture large multi-vertex subgraph structures and deep features of the topological structure through smaller windows size 2. In the present invention, the connection information elements of graph are concentrated in a specific diagonal region of the adjacency matrix. The non-connection information element is reduced in advance, and the filter matrix is further used to extract the subgraph in the diagonal direction. Then convolutional neural network is used to extract larger subgraph structure. On the one hand, it greatly reduces the amount of computation and complexity, solving the limitations of the computation complexity and the limitations of window size. And on the other hand, it can capture large subgraph structure through a small window, as well as deep features from the implicit correlation structures at both vertex and edge level, which improves the accuracy and speed of the graph classification.

3. The connection information regulation module, the feature generation module and the stacked CNN module in the graph classification system provided by the present invention work together to extract larger (the number of vertices is greater than n), deeper and complex features with a small window size n. First, it captures small subgraphs with small window of size n, and then larger, deeper and complex subgraphs with a number of vertices greater than n is extracted by the combination of small subgraphs. That is, it can capture large subgraph structure through a small window, as well as deep features from the implicit correlation structures at both vertex and edge level, which improves the accuracy and speed of the graph classification.

BRIEF DESCRIPTION OF THE DRAWINGS

FIG. 11 is schematic diagram of exchanging column and row of an adjacency matrix.

FIG. 12 is a first adjacency matrix and a reordered second adjacency matrix.

FIG. 13 is a graph and corresponding second adjacency matrix.

FIG. 14 is a diagram of filter matrix movement of feature generation module.

FIG. 15 is a schematic diagram of calculation of a filter matrix of feature generation module.

FIG. 16 is a schematic diagram of zero-padding operation for an adjacency matrix.

DETAILED DESCRIPTION OF THE INVENTION

In order to clearly describe the objectives, technical solutions and advantages of the present invention, we take the system and method of graph feature extraction and graph classification based on adjacency matrix in the computer environment described in the present invention as an example to further elaborate the technical scheme. The following examples are only for illustrating the present invention and are not intended to limit the scope of the present invention. It should be understood that after reading the present invention, various changes or modifications can be made to the present invention, and these equivalent forms also fall within the scope defined by the appended claims of the present invention.

Figures 1, 2, 3:
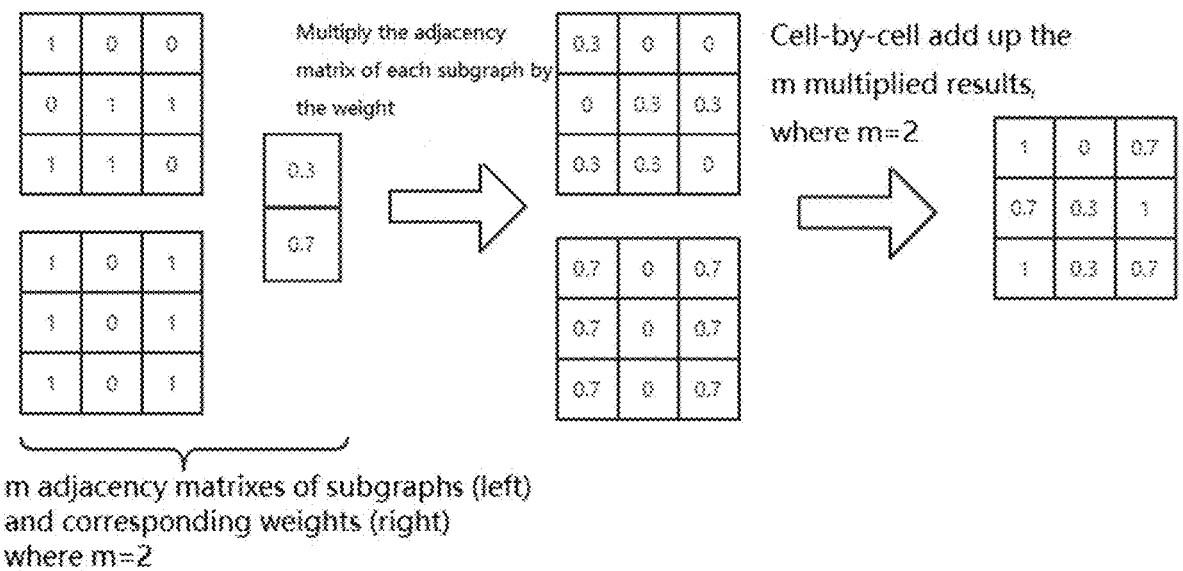
FIG. 1 is a schematic diagram of diagonal area of 6×6 adjacency matrix, width=3.
FIG. 2 is a linear weighted calculation process.
FIG. 3 is a schematic diagram of converting a first adjacency matrix (left) to second adjacency matrix (right).

One embodiment implements a graph feature extraction system based on an adjacency matrix in a computer environment provided by the present invention. The graph feature extraction system extracts features of a graph based on an adjacency matrix of the graph, and the features which correspond to the subgraph directly support the classification. The features are presented in the form of at least one vector, each vector corresponding to the distribution of a mixed state in the graph. The graph feature extraction system comprises a connection information regulation module and a feature generation module, wherein:

The connection information regularization module is configured to reorder all the vertices in the first adjacency matrix of the graph to obtain a second adjacency matrix, and the connection information elements in the second adjacency matrix are mainly distributed in a diagonal area of n of second adjacency, where n is a positive integer, $n \geq 2$ and $n < |V|$, $|V|$ is the number of rows or columns of the second adjacency matrix; preferably, the diagonal region refers to the diagonal region from the upper left corner to the lower right corner of the matrix. For example, the shaded region in FIG. 1 is a diagonal region with a width of 3 in a 6×6 adjacency matrix.

The feature generation module generates features of the graph based on the second adjacency matrix, and the features directly correspond to subgraph structures supporting classification. Each vector corresponds to the distribution of a mixed state in the graph.

The graphs and subgraphs mentioned are graphs in graph theory.

The connection information element is the corresponding element of the edge of the graph in the adjacency matrix.

The connection information regularization module concentrates the connection information elements in the adjacency matrix into a specific diagonal region with a width of n in the second adjacency matrix (n is the size of the subgraph represented by the extracted features, i.e. the window size. And n is a positive integer, $n \geq 2$ and $n < |V|$, the $|V|$ is the number of rows or columns of the second adjacency matrix), which significantly reduces the computational complexity and computational complexity required by subsequent feature generation modules. It solves the problem of limitation due to computational complexity, and then the feature generation module extracts the feature of graph. The connection information regularization module and the feature generation module work together as a whole, which can effectively extract local patterns and connection features in a specific diagonal region with window size of n from datasets with different sizes and different structural complexity.

In the present invention, the vector refers to a quantity having a magnitude and a direction. In mathematics, the vector is a 1×m matrix, where m is a positive integer greater than 1. The features described in the present invention all represent features of a graph.

The adjacency matrix in the present invention refers to a matrix representing the adjacent relationship between the vertices of a graph. The basic properties of the adjacency matrix are that by switching the two columns of the adjacency matrix and the corresponding rows, another adjacency matrix representing the same graph can be generated. Let $G=(V, E)$ be a graph, V is the vertex set (vertex set), $v_i$ is the i-th vertex in V, $|V|$ represents the number of vertices in V, i is positive integers and $i \leq |V|$, E is an edge set. G's adjacency matrix is an n-order square matrix with the following properties:

1) For undirected graphs, the adjacency matrix must be symmetric, and the main diagonal must be zero (only undirected simple graphs are discussed here). The sub-diagonal is not necessarily be zero, and directed graphs are not necessarily so; the main diagonal is the diagonal of the upper left corner to the lower right corner of the matrix; the sub-diagonal is the diagonal of the upper right corner of the matrix to the lower left corner of the matrix.

2) In a directed graph, the degree of any vertex $v_i$ is the number of all non-zero elements in the i-th column (or i-th row); the vertex i is represented as the i-th column (or i-th row) in the matrix. In a directed graph, the in-degree of vertex i is the number of all non-zero elements in the i-th row; the out-degree of the vertex is the number of all non-zero elements in the i-th row; the degree of the vertex is the number of edges associated with the vertex; the out-degree of the vertex is the number of edges start from the vertex and point to other vertices; the in-degree of the vertex is the number of edges starting from other vertices and point to the vertex.

3) The adjacency matrix method needs $|V|^2$ elements to represent a graph. Since the adjacency matrix of an undirected graph must be symmetric, only data in upper right or lower left triangle need to be stored except that zero exists in diagonal. Therefore, only $|V| \times (|V|-1)/2$ elements are needed; when the edges of the undirected graph are edges with weights, the values of the connected elements in the adjacency matrix are replaced by weights, and when there are no connected elements, use 0.

Preferably, the distribution condition refers to the possibility that the subgraph structure in the mixed state appears in the graph; preferably, each of the mixed states represents a linear weight of an adjacency matrix corresponding to any of a plurality of subgraph structures. More preferably, the linear weighting refers to multiply the adjacency matrix of each subgraph by the weight corresponding to the adjacency matrix, and then add the bitwise together to obtain a matrix of the same size as the adjacency matrix of the subgraph. The sum of the weights corresponding to the adjacency matrix is 1; the calculation process is shown in FIG. 2.

The connection information element of the present invention is the corresponding element of the edge of the graph in the adjacency matrix; in the undirected graph, the element value of the i-th row and the j-th column represents whether the connection of the vertex $v_i$ and the vertex $v_j$ exists and whether there are connection weights; the value of the element in the i-th row and the j-th column in the directed graph represents whether the connection of the vertex $v_i$ to the vertex $v_j$ exists and whether there is a connection weight. For example, if there is an edge between the vertex $v_i$ and the vertex $v_j$ in the undirected graph, then the element values of the corresponding i-th row, j-th column and j-th row i-th column in the adjacency matrix are all 1; if there are no edges, the corresponding element values of the i-th row, j-th column and the j-th row, the i-th column are all 0. If there are edges and the weight exists on the edge, they are all w; alternatively, if there is an edge between vertex $v_i$ and vertex $v_j$ in a directed graph and there is an edge starting from vertex $v_i$ to vertex $v_j$, then the element in i-th row and the j-th column of adjacency matrix is 1. If there is no edge pointing to the vertex $v_j$ from the vertex $v_i$, the element value of the corresponding i-th row and j-th column is 0. If there is an edge from the vertex $v_i$ to the vertex $v_j$, and there is a weight w on the edge, then the element value of the corresponding i-th row and j-th column is w; where i, j is a positive integer less than or equal to |V|, |V| is the number of vertices in the graph, w is any real number.

Preferably, if there is no weight on the edge of the graph, the value of the connection information element is 1 and the value of the non-connection information element is 0; more preferably, if the edge of the graph is weighted, then, the value of the connection information element is the edge weight value, and the value of the non-connection information element is 0.

The first adjacency matrix of the present invention refers to the first adjacency matrix obtained by converting the graph into an adjacency matrix in the first step, that is, the initial adjacency matrix before exchanging the corresponding rows and columns. And the second adjacency matrix refers to the matrix obtained by exchanging corresponding rows and columns on first adjacency matrix to concentrate the connection information. The connection information elements in the second adjacency matrix are centrally distributed in a diagonal area of width n of the second adjacency matrix, where n is a positive integer, n≥2 and n<|V|, said |V| is the number of rows or columns of the second adjacency matrix. A schematic diagram of converting the first adjacency matrix to the second adjacency matrix is shown in FIG. 3. The left is the first adjacency matrix, and the right is the second adjacency matrix.

Preferably, the feature generation module generates a feature of the graph by using a filter matrix, and the filter matrix is a square matrix; more preferably, the feature generation module uses at least one filter matrix along the diagonal region of second adjacency matrix to obtain at least one vector corresponding to the features of the graph. The features which correspond to the subgraph directly support the classification and are presented in the form of at least one vector, and each vector corresponds to the distribution of a mixed state in the graph.

Preferably, the filtering operation is to add the inner product of filter matrix and second adjacency matrix and get the value through an activation function. Filter matrix moves diagonally to obtain a set of values to form a vector corresponding to the distribution of a subgraph structure in the graph; more preferably, the activation function is a sigmoid function, a ReLU activation function, or a pReLU function.

Preferably, the feature generation module uses different filter matrix to perform the filtering operation.

Preferably, the initial value of each element in the filter matrix is a value of a random variable taken from the Gaussian distribution, respectively. The Gaussian distribution is a probability distribution. The Gaussian distribution is the distribution of continuous random variables with two parameters $\mu$ and $\sigma$. The first parameter $\mu$ is the mean value of the random variable that obeys the normal distribution, and the second parameter $\sigma$ is the variance of the random variable. When the value of a random variable is taken from a Gaussian distribution, the closer the value of the random variable taken to $\mu$, the greater the probability, while the greater the distance from $\mu$, the smaller the probability.

Preferably, the elements in the filter matrix are real number greater than or equal to −1 and less than or equal to 1; more preferably, the elements in the filter matrix are real numbers greater than or equal to 0 and less than or equal to 1.

Preferably, the feature generation module participates in a machine learning process for adjusting the values of the elements of the filter matrix.

Preferably, the machine learning process utilizes back propagation to calculate the gradient value by using the loss value and further adjust the values of each element in the filter matrix.

The loss value refers to the error between the output of the machine learning process and the actual output that should be obtained; the gradient can be taken as the slope of a curved surface along a given direction, and the gradient of the scalar field is a vector field. The gradient at one point in the scalar field points to the fastest growing direction of the scalar field, and the gradient value is the largest rate of change in this direction.

The machine learning process described consists of a forward propagation process and a back propagation process. In the forward propagation process, input information is processed layer by layer from the input layer to the hidden layer and finally passed to the output layer. If the desired output value is not obtained in the output layer, the sum of the square error between output and the expected value is used as the objective function, and the back propagation is performed. The partial derivative of the target function for each neuron weight is calculated layer by layer. The gradient of the weight vector of the function is used as a basis for modifying the weight value, and the machine learning process is completed during the weight value modification process. When the error converges to the desired value or reaches the maximum epochs of leanings, the machine learning process ends. The initial values of the elements in the filter matrix are the values of the random variables taken from the Gaussian distribution, which are then updated by back propagation in the machine learning process and are optimized at the end of the machine learning process.

Preferably, the hidden layer refers to each layer other than the input layer and the output layer, and the hidden layer does not directly receive signals from the outside world and does not directly send signals to the outside world.

Further, the diagonal region of the second adjacency matrix is composed of the following elements: a positive integer i traverses from 1 to |V|, and when i>max(n, |V|−n), the i-th row is selected. Element of (i−n+1) to |V| column; when i≤n, select elements from 0-th to i+n−1 th columns in the i-th row; when max(n,|V|−n)≥I≥min(|V|−n,n), then in the i-th column, select elements from (i−n+1)-th column to (i+n−1)-th column;

Preferably, the diagonal region of the second adjacency matrix refers to a scanned area that is scanned diagonally by using a scanning rectangle with a size of n×n. The scanning process is described as follows. First, the upper left corner of the scanning rectangle is coincident with the upper left corner of the second adjacency matrix; then each time, the scanning rectangle is moved to the right and the down by one grid, until the lower right corner of the scanning rectangle coincides with the lower right corner of the second adjacency matrix.

Further, the size of the filter matrix is n×n, that is, the size of the filter matrix is the same as the width of the diagonal region in the second adjacency matrix. After connecting the information elements concentrated into the diagonal region, a filter matrix is used to perform diagonal convolution and extracts the distribution of the subgraph structure of size n in the graph as much as possible under the premise of O(n) time complexity.

Further, the connection information regularization module is configured to reorder all the vertices of the first adjacency matrix so that concentration of connection information elements in the diagonal region of the second adjacency matrix is maximized; concentration of connection information elements refers to the ratio of non-zero elements in the diagonal area;

Preferably, the reordering method is an integer optimization algorithm, which is used to concentrate the connection information elements in the matrix into the diagonal region and maximize the concentration of the connection information elements; the referred integer optimization algorithm maximizes concentration of the information elements of the matrix by exchanging the corresponding two rows and columns in the matrix at the same time;

Further, the reordering method is a greedy algorithm. It comprises the following steps:
(1) Initial Input: Input the first adjacency matrix of the input graph as adjacency matrix to be processed (pending adjacency matrix).
(2) Swap Pairs Calculation: Calculate all possible vertex exchange pairs in the pending adjacency matrix.
(3) Row and Column Exchange: It is judged whether all possible vertex exchange pairs are in a processed state. If yes, the pending adjacency matrix is output to obtain the second adjacency matrix, and the greedy algorithm ends; otherwise, one vertex exchange pair is selected as the current vertex exchange pair, and switch the corresponding two rows and two columns in the pending adjacent matrix to generate a new adjacency matrix and jump to step (4);
(4) Exchange Evaluation: Calculate the concentration of connection information elements in new adjacency matrix. If the concentration of connection information elements in the new adjacency matrix is higher than before, the exchange is accepted. The adjacency matrix replaces the pending adjacency matrix, and jumps to step (2); if the concentration of connection information elements in the new adjacency matrix is lower than or equal to the pending adjacency matrix, then, the exchange is abandoned and the current vertex exchange pair is marked as a processed state, and the process jumps to step (3).

Figure 4:
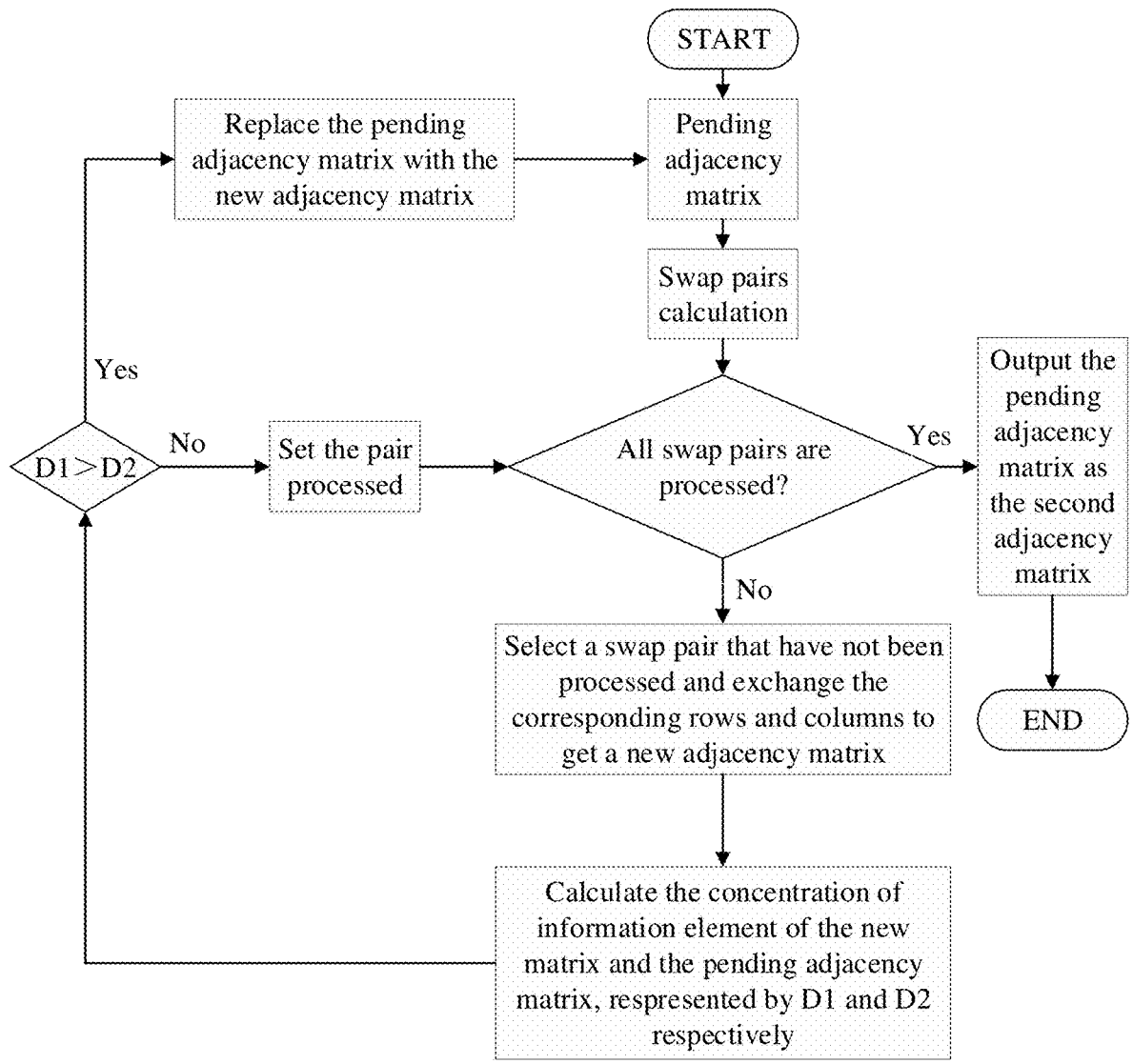
FIG. 4 is a flow diagram of greedy algorithm.

The flow diagram of the greedy algorithm refers to FIG. 4.

Further, the reordering method is a branch and bound algorithm. It comprises the following steps:
(1) Initial Input: Input the first adjacency matrix of the input graph as a adjacency matrix to be processed (pending adjacency matrix).
(2) Swap Pairs Calculation: Calculate all possible vertex exchange pairs in the pending adjacency matrix.
(3) Row and Column Exchange: It is judged whether all possible vertex exchange pairs are in a processed state. If yes, then the pending adjacency matrix is output to obtain the second adjacency matrix, and the branch and bound algorithm ends; otherwise, perform an exchange operation for each of the unprocessed vertex exchange pairs and jump to step (4). The exchange operation refers to simultaneous exchange of the two corresponding rows and columns in the pending adjacency matrix, and a new adjacency matrix is generated for each of said vertex exchange pairs performing the exchange operation;
(4) Exchange Evaluation: Calculate the concentration of connection information elements in each of the new adjacency matrixes, and if there is a new adjacency matrix in which the concentration of connection information elements is higher than before, select the newest adjacency matrix with the highest concentration and mark the vertex exchange pair as the processed state, and then go to step (3); If there is not a matrix whose concentration of elements is higher than the pending adjacent matrix, the current adjacency matrix to be processed is output to obtain the second adjacency matrix, and the branch and bound algorithm ends.

Figure 5:
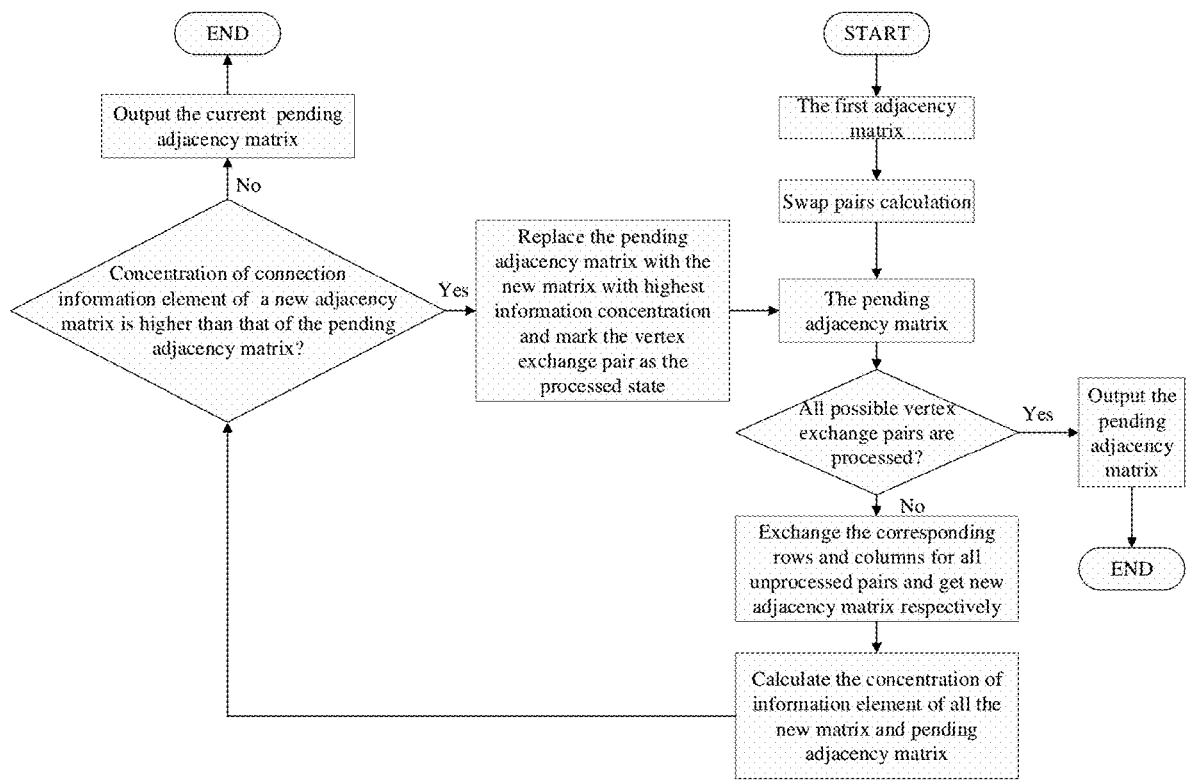
FIG. 5 is a flow diagram of branch and bound algorithm.

The flow diagram branch and bound algorithm refers to FIG. 5.

Further, the concentration of connection information elements in the diagonal region of the second adjacency matrix depends on the number of connection information elements and/or the number of non-connection information elements in the diagonal region.

Further, the concentration of connection information elements in the diagonal region of the second adjacency matrix depends on the number of connection information elements outside the diagonal region and/or the number of non-connection information elements.

Further, the concentration can be measured by the loss value. The smaller the Loss value is, the higher the concentration is, and the method for calculating the Loss value is as follows:

$$LS(A, n) = \sum_{i=1}^{n} \sum_{j=i+n}^{|V|} A_{i,j} + \sum_{i=n+1}^{|V|} \sum_{j=1}^{i-n} A_{i,j}$$

In the formula, LS(A, n) represents the loss value, A denotes the second adjacency matrix, n denotes the number of rows or columns of the filter matrix, and $A_{i,j}$ denotes the i-th row and j column elements in the second adjacency matrix. Preferably, the LS(A, n) denotes the Loss value of the second adjacency matrix A when the filter matrix size is n×n. The smaller the Loss value is, the higher the concentration is.

Further, the concentration can also be measured by the ZR value. The smaller the ZR value is, the higher the concentration is, and the method for calculating the ZR value is as follows:

$$TC(A, n) = \sum_{i=1}^{n} \sum_{j=1}^{|V|-n+i-1} C_{i,j} + \sum_{i=n+1}^{|V|} \sum_{j=i-n+1}^{|V|} C_{ij}$$

$$T1(A, n) = \sum_{i=1}^{n} \sum_{j=1}^{|V|-n+i-1} A_{i,j} + \sum_{i=n+1}^{|V|} \sum_{j=i-n+1}^{|V|} A_{i,j}$$

$$ZR(A, n) = \frac{TC \times T1}{TC}$$

In the aforementioned formula, A denotes the second adjacency matrix, C denotes the matrix with the same size of the A and all elements are connections information elements, $A_{i,j}$ denotes the elements of the i-th row and j-th column in A. $C_{i,j}$ denotes the element of row i and column j in C. TC(A, n) and TC denotes the total number of elements in the diagonal region with width n in A. T1(A, n) and T1 denotes the number of connected information elements in the diagonal region with width n in A. ZR(A, n) denotes the ZR value, which means the proportion of non-connected information elements in the diagonal region with width n, and n denotes the number of rows or columns of the filter matrix. Preferably, the ZR(A, n) denotes the ZR value of the second adjacency matrix A when the filter matrix size is n×n. The smaller the ZR value is, the higher the concentration of the second adjacency matrix is.

An embodiment implements the graph classification system based on adjacency matrix in a computer environment provided by the present invention comprises a class labeling module and any form of feature extraction based on adjacency matrix in a computer environment as described above. In the system, the class labeling module labels the graph based on the features extracted by the graph feature extraction system, and outputs the class of the graph; the graph is graph in graph theory.

Preferably, the class labeling module calculates the possibility that the graph belongs to a class, and labels graph as the class with the highest possibility, and completes the classification of the graph.

Preferably, the class labeling module uses the classification algorithm to calculate the possibility that the graph belongs to each class, and labels the graph as the class with the highest possibility to complete the classification of the graph; more preferably, the classification algorithm is selected from any one of kNN, a linear classification algorithm, or any of a plurality of types.

The kNN algorithm means that if most of the nearest samples (number=k) in a feature space belong to a certain class, the sample also belongs to that class and has the characteristics of the samples in this class. This method determines the class based on the nearest one or several samples. The linear classification algorithm means that based on the distribution in the feature space determined by the labeling module, the data is classified using a straight line (or plane, hyperplane). A label is a description of a classification.

Further, the graph classification system comprises a stacked CNN module, and the stacked CNN module processes features generated by the graph feature extraction system, and merges the subgraph structures features supporting the classification and generates the feature which represents larger subgraph structure in the graph. The larger subgraph structure refers to is a subgraph structure with more than n vertices.

Preferably, the stacked CNN module comprises convolution submodule and pooling submodule.

The convolution submodule uses at least one convolution layer to perform a convolution operation on features generated by the graph feature extraction system, and merges the subgraph structures features supporting the classification to obtain at least one vector as the result of convolution. The input of the first convolutional layer is the feature generated by any of the forms of the graph feature extraction system as described above. If there are multiple convolutional layers, the input of each convolutional layer is the result of the previous convolutional layer. The output of each convolutional layer is at least one vector. Each convolutional layer uses at least one filter matrix for the convolution operation, and the result of the last convolutional layer is outputted to the pooling submodule.

Further, the convolution operation refers to a calculation method using a filter matrix to move an adjacency matrix at parallel level with some pattern, multiply bitwisely and sum up to get a value and use the values obtained to constitute a vector or a matrix.

The filter matrix is a square matrix; the number of rows of the filter matrix in each of the convolution layers is the same as the number of vectors input to the convolution layer; preferably, the elements in the filter matrix are real numbers greater than or equal to −1 and less than or equal to 1; more preferably, the elements in the filter matrix are real numbers greater than or equal to 0 and less than or equal to 1.

The pooling submodule is configured to perform a pooling operation on the matrix obtained by the convolution submodule, obtain at least one vector as a pooling result and output to the class labeling module to label the graph. The pooling result comprises features of a larger subgraph structure in the graph; the larger subgraph structure refers to a subgraph structure having more than n vertices; preferably, the pooling operation is selected from the group consisting of max-pooling and average-pooling. The max-pooling refers to taking the maximum value from the neighborhood; the average-pooling refers to averaging the values among the neighborhood.

Further, the pooling operation is based on the convolution operation and performs mathematical operations on each convolution result, thereby reducing the dimension of the convolution result. The mathematical operations comprise but are not limited to averaging and taking the maximum value.

Figure 6:
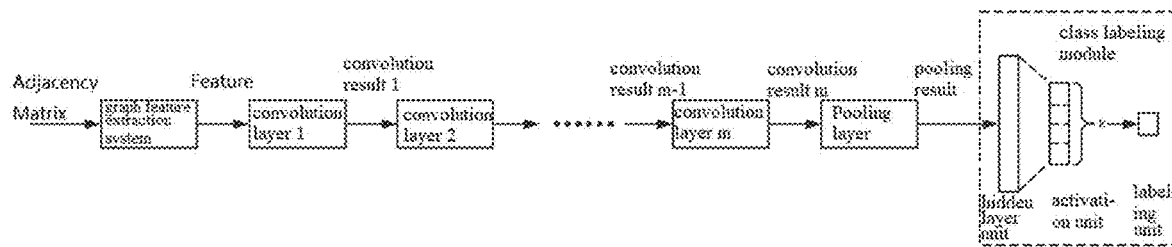
FIG. 6 is a data flow diagram of stacked CNN module.

Preferably, a data flow diagram of the stacked CNN module is shown in FIG. 6.

The stacked CNN module extracts larger, deeper and more complex features, which correspond to larger, deeper and more complex subgraph in the graph, from the feature generated by feature generation module through a series of convolutional layers. The connection information regulation module, the feature generation module and the stacked CNN module in the graph classification system provided by the present invention work together to extract larger (the number of vertices is greater than n), deeper and complex features with a small window size n. First, it captures small subgraphs with small window of size n, and then larger, deeper and complex subgraphs with the number of vertices greater than n is extracted by the combination of small subgraphs. That is, it can capture large subgraph structure through a small window, as well as deep features from the implicit correlation structures at both vertex and edge level, which improves the accuracy and speed of the graph classification.

Further, the graph classification system comprises an independent pooling module and a convolution pooling module; the independent pooling module performs pooling operation on the feature extracted by graph feature extraction system to obtain at least one vector as the first pooling result and output to class labeling module. The convolution pooling module performs convolution and pooling operation on the input features extracted by any form of the graph feature extraction system as described above. It merges the subgraph structures features supporting the classification, generating a second pooling result representing a larger subgraph structure feature and output it to the class labeling module. The class labeling module classifies the graph and output the class label of graph according to the first pooling result and the second pooling result; the larger subgraph structure refers to a subgraph structure with more than n vertices.

Preferably, the convolution pooling module comprises a convolution submodule and a pooling submodule. The convolution submodule uses at least one filter matrix to perform convolution operation on the input merge the features which can support classification to obtain at least one vector as convolution result and output it to the pooling submodule. The pooling submodule performs the pooling operation on the convolution result to obtain at least one vector as the second pooling result and output it to class labeling module. The second pooling result contains features of a larger subgraph structure in the graph.

The filter matrices are square matrixes; the number of rows of the filter matrix in each of the convolution layers is the same as the number of vectors input to the convolution layer; preferably, the elements in the filter matrix are real numbers and greater than or equal to −1 and less than or equal to 1; more preferably, the elements in the filter matrix are real numbers greater than or equal to 0 and less than or equal to 1. Preferably, the pooling operation is selected from the largest pooling operation, the average pooling operation.

Figure 7:
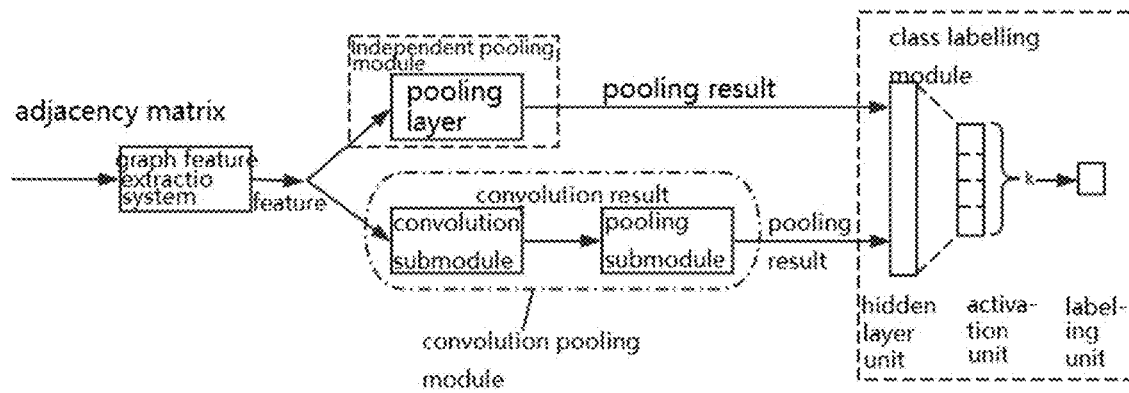
FIG. 7 is a data flow diagram of stacked CNN module with independent pooling and convolution pooling module.

Preferably, the data flow diagram of the stacked CNN module comprising the independent pooling module and the convolutional pooling module is shown in FIG. 7.

Further, the graph classification system further comprises an independent pooling module and multiple convolution pooling modules; the independent pooling module performs pooling operation on the feature extracted by graph feature extraction system to obtain at least one vector as the first pooling result and output to class labeling module. The convolution pooling module performs convolution and pooling operation on the input features in turn. Convolution operation is performed to merge the subgraph structures features supporting the classification and generate a convolution result. The pooling operation is performed on the convolution result to obtain at least a vector as pooling result which contains larger subgraph structure feature. The convolution result of previous convolution pooling module is output to the next convolution pooling module and the pooling result of each convolution pooling module is output to the class labeling module. The class labeling module classifies the graph and output the class label of graph according to the first pooling result and all the pooling result of convolution pooling module.

Wherein, the input of the first convolution pooling module is the feature generated by any form of the graph feature extraction system as described above and the input of other convolution pooling module is the convolution result of the previous convolution pooling module. The last convolution pooling module only outputs the pooling result to the class labeling module; the larger subgraph structure refers to the subgraph structure with more than n vertices.

Preferably, the convolution pooling module comprises a convolution submodule and a pooling submodule. The convolution submodule uses at least one filter matrix to perform convolution operation on the input merge the features which can support classification to obtain at least one vector as convolution result and output it to the next convolution pooling module. The pooling submodule performs the pooling operation on the convolution result to obtain at least one vector as pooling result and output it to class labeling module. The pooling result contains features of a larger subgraph structure in the graph. Preferably, the number of convolution submodule and pooling submodule may be the same or different. Preferably, the number of convolution submodule and pooling submodule is one or many.

The filter matrices are square matrices; the number of rows of the filter matrix in each of the convolution layers is the same as the number of vectors input to the convolution layer; preferably, the elements in the filter matrix are real numbers and greater than or equal to −1 and less than or equal to 1; more preferably, the elements in the filter matrix are real numbers greater than or equal to 0 and less than or equal to 1.

Preferably, the number of the convolution pooling modules is less than or equal to 10, and more preferably, the number of convolution pooling modules in the graph classification system is less than or equal to 5; more preferably, the number of the convolution pooling modules is less than or equal to 5. The number of convolution pooling modules in the graph classification system is less than or equal to 3;

Preferably, the pooling operation is selected from the largest pooling operation and the average pooling operation.

Figure 8:
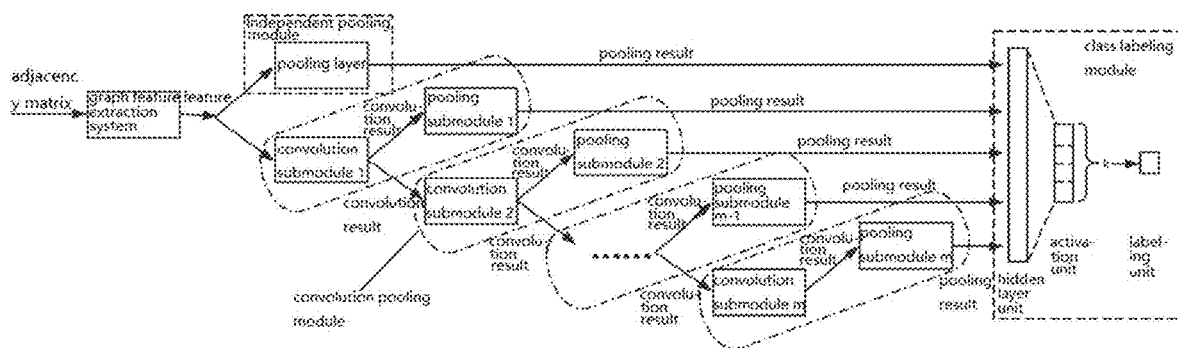
FIG. 8 is a data flow diagram of stacked CNN module with independent pooling and multiple convolution pooling module.

Preferably, the data flow diagram of the stacked CNN module comprising the independent pooling module and the multiple convolution pooling modules is shown in FIG. 8.

Further, the element values of the vector of convolution result represents the possibility that the sub-graph structure appears at various positions on the graph. And the element values of the pooling result, the first pooling result, and the second pooling result represents the maximum or average probability that the subgraph structure appears in the graph.

Further, the class labeling module comprises a hidden layer unit, an activation unit, and a labeling unit.

The hidden layer unit processes the received vector to obtain at least one mixed vector and output it to the activation unit, and the mixed vector contains information of all vectors received by the hidden layer unit. The hidden layer unit combines the input vectors as a combined vector and performs a linear weighted operation on the combined vector using at least one weighted vector to obtain at least one mixed vector. Preferably, the hidden layer refers to any layer other than the input layer and the output layer, and the hidden layer does not directly receive signals from the outside world and does not directly send signals to the outside world.

The activation unit calculates a value for each mixed vector output by the hidden layer unit using an activation function, and outputs all the values as a vector to the labeling unit; preferably, the activation functions performed are sigmoid function, ReLU activation function, pReLU function.

The labeling unit is configured to calculate the possibility that the graph belongs to each class according to the result of the activation unit and labels the class with the highest possibility as the classification result of the graph to complete the classification. Preferably, the labeling unit calculates the probability that the graph belongs to each classification label based on the classification algorithm and labels the class with the highest possibility as the classification result of the graph to complete the classification. More preferably, the classification algorithm is any one or more than one of the kNN and the linear classification algorithm.

One embodiment implements a graph feature extraction method based on adjacency matrix in a computer environment provided by the present invention. The method extracts features of a graph based on adjacency matrix of the graph, the features which correspond to the subgraph directly support the classification. The features are presented in the form of at least one vector, and each vector corresponds to the distribution of a mixed state in the graph. The method comprises the following steps:

(1) Edge information regularization: Reorder all the vertices in the first adjacency matrix to obtain second adjacency matrix and the connection information elements in the second adjacency matrix are concentrated into a diagonal region with width n, where n is a positive integer, n≥2 and n<|V|. |V| is the number of rows or columns of the second adjacency matrix. The connection information element in the adjacency matrix is the corresponding element of the edge of the graph. Preferably, the diagonal region refers to the diagonal region from the upper left corner to the lower right corner of the matrix.

(2) Diagonal filtering: Based on the second adjacency matrix obtained in step (1), the features of the graph are generated. The features which correspond to the subgraph directly support the classification, and each vector corresponds to the distribution of a mixed state in the graph.

The graphs and subgraphs are graphs in graph theory.

Preferably, the step (2) utilizes a filtering matrix to generate features of the graph and the filtering matrix is a square matrix. More preferably, the step (2) utilizes at least one filter matrix along the diagonal region of second adjacency matrix to obtain at least one vector corresponding to the features of the graph. The features which correspond to the subgraph directly support the classification and are presented in the form of at least one vector, and each vector corresponds to the distribution of a mixed state in the graph.

Preferably, the step (2) uses different filter matrixes to perform the filtering operation.

Preferably, if there is no weight on the edge of the graph, the value of the connection information element is 1 and the value of the non-connection information element is 0; if the edge of the graph is weighted, the value of the connection information element is the weight of the edge, and the value of the non-connection information element is 0.

Preferably, the distribution condition refers to the possibility that the subgraph structure in the mixed state appears in the graph; preferably, each of the mixed states represents a linear weight of an adjacency matrix corresponding to any of a plurality of subgraph structures. More preferably, the linear weighting refers to multiply the adjacency matrix of each subgraph by the weight corresponding to the adjacency matrix, and then add bitwise together to obtain a matrix of the same size as the adjacency matrix of the subgraph.

Preferably, the filtering operation is to add the inner product of filter matrix and second adjacency matrix and get the value through an activation function. Filter matrix moves diagonally to obtain a set of values to form a vector corresponding to the distribution of a subgraph structure in the graph; more preferably, the activation function is a sigmoid function, a ReLU activation function, and a pReLU function.

Preferably, the initial values of each element in the filter matrix are the values of random variables taken from the Gaussian distribution respectively;

Preferably, the elements in the filter matrix are real numbers greater than or equal to −1 and less than or equal to 1, more preferably, the elements in the filter matrix are real numbers greater than or equal to 0 and less than or equal to 1.

Preferably, the step (2) participates in a machine learning process for adjusting the values of the elements of the filter matrix.

Preferably, the machine learning process utilizes back propagation to calculate the gradient value by using the loss value and further adjust the values of each element in the filter matrix. More preferably, the feature generation module can use different filter matrix to perform the filter operation.

Preferably, if there is no weight on the edge of the graph, the value of the connection information element is 1 and the value of the non-connection information element is 0; more preferably, if the edge of the graph is weighted, then, the value of the connection information element is the weight of the edge value, and the value of the non-connection information element is 0.

Further, the diagonal region of the second adjacency matrix is composed of the following elements: a positive integer i traverses from 1 to |V|, and when i>max(n, |V|−n), the i-th row is selected. Element of (i−n+1) to |V| column; when i≤n, select elements from 0-th to i+n−1th columns in the i-th row; when max(n,|V|−n)≥I≥min(|V|−n,n), then in the i-th column, select elements from (i−n+1)-th column to (i+n−1)-th column.

Preferably, the diagonal region of the second adjacency matrix refers to a scanned area that is scanned diagonally by using a scanning rectangle with a size n×n.

More preferably, the scanning process is described as follows. First, the upper left corner of the scanning rectangle is coincident with the upper left corner of the second adjacency matrix; then each time the scanning rectangle is moved to the right side and the down side by one grid, until the lower right corner of the scanning rectangle coincides with the lower right corner of the second adjacency matrix.

Further, the size of the filter matrix is n×n.

Further, the edge information regularizing step of the step (1) reorders all the vertices of the first adjacency matrix, so that the concentration of connection information elements in the diagonal region of the second adjacency matrix after sorting is the highest. Preferably, the reordering method is an integer optimization algorithm.

Further, the reordering method is a greedy algorithm and comprises the following steps:

(1) Initial Input: Input the first adjacency matrix of the input graph as pending adjacency matrix.

(2) Swap Pairs Calculation: Calculate all possible vertex exchange pairs in the pending adjacency matrix.

(3) Row and Column Exchange: It is judged whether all possible vertex exchange pairs are in a processed state. If yes, the pending adjacency matrix is output to obtain the second adjacency matrix, and the greedy algorithm ends; otherwise, one vertex exchange pair is selected as the current vertex exchange pair, and switch the corresponding two rows and two columns in the pending adjacent matrix to generate a new adjacency matrix and jump to Step (4);

(4) Exchange Evaluation: Calculating the concentration of connection information elements in new adjacency matrix. If the concentration of connection information elements in the new adjacency matrix is higher than before, the exchange is accepted. The adjacency matrix replaces the pending adjacency matrix, and jumps to step (2); if the concentration of connection information elements in the new adjacency matrix is lower than or equal to before. Then, the exchange is abandoned and the current vertex exchange pair is marked as a processed state, and the process jumps to step (3).

Further, the reordering method is a branch and bound algorithm and comprises the following steps:

(1) Initial Input: Input the first adjacency matrix of the input graph as pending adjacency matrix.

(2) Swap Pairs Calculation: Calculate all possible vertex exchange pairs in the pending adjacency matrix.

(3) Row and Column Exchange: It is judged whether all possible vertex exchange pairs are in a processed state. If yes, then the pending adjacency matrix is output to obtain the second adjacency matrix, and the branch and bound algorithm ends; otherwise, perform an exchange operation for each of the unprocessed vertex exchange pairs and jump to step (4). The exchange operation refers to simultaneous exchange of the two corresponding rows and columns in the pending adjacency matrix, and a new adjacency matrix is generated for each of said vertex exchange pairs performing the exchange operation;

(4) Exchange Evaluation: Calculating the concentration of connection information elements in each of the new adjacency matrixes, and if there is a new adjacency matrix in which the concentration of connection information elements is higher than before, select the newest adjacency matrix with the highest concentration and mark the vertex exchange pair as the processed state, and then go to step (3); If there is not a matrix whose concentration of elements is higher than before, the current adjacency matrix to be processed is output to obtain the second adjacency matrix, and the branch and bound algorithm ends.

Further, the concentration of connection information elements in the diagonal region of the second adjacency matrix depends on the number of connection information elements and/or the number of non-connection information elements in the diagonal region.

Further, the concentration of connection information elements in the diagonal region of the second adjacency matrix depends on the number of connection information elements outside the diagonal region and/or the number of non-connection information elements.

Further, the concentration can be measured by the loss value. The smaller the loss value is, the higher the concentration is, and the method for calculating the loss value is as follows:

$$LS(A, n) = \sum_{i=1}^{n}\sum_{j=i+n}^{|V|} A_{i,j} + \sum_{i=n+1}^{|V|}\sum_{j=1}^{i-n} A_{i,j}$$

In the formula, LS(A, n) represents the Loss value, A denotes the second adjacency matrix, n denotes the number of rows or columns of the filter matrix, and $A_{i,j}$ denotes the i-th row and j column elements in the second adjacency matrix. Preferably, the LS(A, n) denotes the Loss value of the second adjacency matrix A when the filter matrix size is n×n. The smaller the Loss value is, the higher the concentration is.

Further, the concentration can also be measured using the ZR value. The smaller the ZR value is, the higher the concentration is, and the method for calculating the ZR value is as follows:

$$TC(A, n) = \sum_{i=1}^{n}\sum_{j=1}^{|V|-n+i-1} C_{i,j} + \sum_{i=n+1}^{|V|}\sum_{j=i-n+1}^{|V|} C_{ij}$$

$$T1(A, n) = \sum_{i=1}^{n}\sum_{j=1}^{|V|-n+i-1} A_{i,j} + \sum_{i=n+1}^{|V|}\sum_{j=i-n+1}^{|V|} A_{i,j}$$

$$ZR(A, n) = \frac{TC \times T1}{TC}$$

In the formula, A denotes the second adjacency matrix, C denotes the matrix with the same size of the A and all elements are connections information elements, $A_{i,j}$ denotes the elements of the i-th row and j-th column in A. $C_{i,j}$ denotes the element of row i and column j in C. TC(A, n) and TC denotes the total number of elements in the diagonal region with width n in A. T1(A, n) and T1 denotes the number of connected information elements in the diagonal region with width n in A. ZR(A, n) denotes the ZR value, which means the proportion of non-connected information elements in the diagonal region with width n, and n denotes the number of rows or columns of the filter matrix. Preferably, the ZR(A, n) denotes the ZR value of the second adjacency matrix A when the filter matrix size is n×n. The smaller the ZR value is, the higher the concentration of the second adjacency matrix is.

An embodiment implements a method for classifying a graph based on adjacency matrix in a computer environment provided by the present invention. The method for classifying a graph comprises the following steps:

(1) Feature Extraction: Using the graph feature extraction method based on adjacency matrix of any form as described previously to extract the features of the graph.

(2) Class Labeling: Based on the features extracted in step (1), classify the graph and output the class of the graph. The graph is the graph in graph theory. Preferably, the step (2) calculates the possibility that the graph belongs to each class, and labels graph as the class with the highest possibility, and completes the classification of the graph. Preferably, the step (2) uses the classification algorithm to calculate the possibility that the graph belongs to each class, and labels the graph as the class with the highest possibility to complete the classification of the graph; more preferably, the classification algorithm is selected from any one of kNN, a linear classification algorithm, or any of a plurality of types.

An embodiment implements a method for classifying a graph based on stacked CNN in a computer environment provided by the present invention. The method for classifying a graph comprises the following steps:

(1) Feature extraction: Using the graph feature extraction method based on adjacency matrix of any form as described previously to extract the features of the graph.

(2) Convolution Operation: Using at least one convolutional layer to perform convolution operation on the features extracted in step (1) and merging the subgraph structures features which support the classification to obtain at least one vector as convolution result. The input of the convolutional layers is the feature extracted in step (1). If there are multiple convolution layers, the input of each convolutional layer is the result of the previous convolutional layer and the result of each convolutional layer is at least one vector, each convolution layer uses at least one filter matrix for convolution operation and the convolution result of the last convolution layer is output to step (3). The filter matrix is a square matrix. The number of rows of the filtering matrix in each convolution layer is the same as the number of vectors input to the convolution layer. Preferably, the elements in the filtering matrix are real numbers greater than or equal to −1 and less than or equal to 1. More preferably, the elements in the filter matrix are real numbers greater than or equal to 0 and less than or equal to 1.

(3) Pooling Operation: Pool the result of the convolution operation in step (2) and obtaining at least one vector as a pooling result and outputting it to step (4). The pooling result contains larger subgraph structure of the graph with more than n vertices. Preferably, the pooling operation is selected from maximum pooling and average pooling.

(4) Class Labeling: Labeling the graph and outputting the class of graph according to the pooling result obtained by step (3).

An embodiment implements another method for classifying graph based on stacked CNN in computer environment provided by the present invention. The method for classifying a graph comprises the following steps:

(1) Feature Extraction: Using the graph feature extraction method based on adjacency matrix of any form as described previously to extract the features of the graph and output to the step (2) and (3).

(2) Independent Pooling Operation: Pooling the features extracted in step (1) to obtain at least one vector as the first pooling result and outputting to step (4).

(3) Convolution Pooling Operation: Using at least one convolutional layer to perform convolution operation on the features extracted in step (1) and merging the subgraph structures features which support the classification to obtain at least one vector as convolution result. Then the pooling operation is performed on it to obtain at least on vector as the second pooling result and output to step (4). The second pooling result contains the feature of larger subgraph structure with more than n vertices. The filter matrix is square matrix. The number of rows of the filtering matrix in each convolution layer is the same as the number of vectors input to the convolution layer. Preferably, the elements in the filtering matrix are real numbers greater than or equal to −1 and less than or equal to 1. More preferably, the elements in the filter matrix are real numbers greater than or equal to 0 and less than or equal to 1. Preferably, the pooling operation is selected from maximum pooling and average pooling.

(4) Class Labeling: Labeling the graph and outputting the class of graph according to the first pooling result and the second pooling result.

One embodiment implements another method for classifying graph based on stacked CNN in computer environment provided by the present invention. The method for classifying a graph comprises the following steps:

(1) Feature Extraction: Using the graph feature extraction method based on adjacency matrix of any form as described previously to extract the features of the graph and output to the step (2) and (3).

(2) Independent Pooling Operation: Pooling the features extracted in step (1) to obtain at least one vector as the first pooling result and outputting to step (3) and (4).

(3) Convolution and Pooling Operation: Using at least one convolutional layer to perform convolution operation on the features extracted in step (1) and merging the subgraph structures features which support the classification to obtain at least one vector as convolution result. Then the pooling operation is performed on it to obtain at least on vector as pooling result which contains the feature of larger subgraph structure with more than n vertices. The convolution result of previous level is output to the next convolution and pooling operation and the pooling result of each level is output to the step (4). Wherein, the input of the first level convolution and pooling operation is the feature extracted in step (1). If there are multi-level convolution and pooling operation, the input of each level is the result of previous one, and only pooling result is output to the step (4) in the last level. The filter matrix is square matrix. The number of rows of the filtering matrix in each convolution layer is the same as the number of vectors input to the convolution layer. Preferably, the elements in the filtering matrix are real numbers greater than or equal to −1 and less than or equal to 1. More preferably, the elements in the filter matrix are real numbers greater than or equal to 0 and less than or equal to 1. Preferably, the pooling operation is selected from maximum pooling and average pooling.

(4) Class Labeling: Labeling the graph and outputting the class of graph according to the first pooling result and all the pooling result in the step (3).

Further, the element values of the convolution result vector represent the possibility that the sub-graph structure appears at various positions on the graph. And the element values of the pooling result, the first pooling result, and the second pooling result represent the maximum or average probability that the subgraph structure appears in the graph.

Further, the class labeling comprises the following steps:

(1) Feature Merging: The received vector is processed by the hidden layer and at least one mixed vector is obtained and output to step (2). The mixed vector contains information of all vectors received by the hidden layer. Preferably, the process described combines the input vectors into a combined vector and uses at least one weight vector to linearly weight the combined vector to obtain at least one mixed vector.

(2) Feature Activation: Calculating a value for each mixed vector output by the hidden layer using an activation function, and outputting all the resulting values as a vector step (3); preferably, the activation functions performed are sigmoid function, ReLU activation function, pReLU function.

(3) Class Labeling: The class labeling is configured to calculate the possibility that the graph belongs to any class according to the result of the activation and labels the class with the highest possibility as the classification result of the graph to complete the classification. Preferably, the class labeling calculates the probability that the graph belongs to which classification label based on the classification algorithm and labels the class with the highest possibility as the classification result of the graph to complete the classification. More preferably, the classification algorithm is any one or more than one of the kNN and the linear classification algorithm.

One embodiment implements a graph classification system provided by the present invention. The vertex of the graph is an arbitrary entity, and an edge of the graph is a relationship between entities.

Preferably, entity is any independent individual or set of individuals, actual or virtual. Preferably, the entity may be one or a combination of persons, things, events, and concepts. More preferably, any of the entities is selected from the group atoms in a compound or a single substance, any one or more of humans, commodities, and events in a network.

Preferably, the relationship is any relationship between entities. More preferably, the relationship is a chemical bond connecting atoms, a link between commodities, and a person-to-person relationship. More preferably, the relationship is the link between the commodities comprises a causal relationship and a correlative relationship of the purchased merchandise. More preferably, the person-to-person relationship comprises an actual blood relationship, a friend relationship, a follow relationship, transaction or message relationship in a virtual social network.

One embodiment implements a network structure classification system provided by the present invention. The classification system implements a network structure classification based on any form of graph classification system as described above. The vertex of the graph is a node in the network. The edge of the graph is the relationship between nodes in the network. Preferably, the network is selected from the group consisting of electronic network, social network and logistics network. More preferably, the electronic network is selected from the group consisting of a local area network, a metropolitan area network, a wide area network, the Internet, 4G, 5G, CDMA, Wi-Fi, GSM, WiMax, 802.11, infrared, EV-DO, Bluetooth, GPS satellites, and/or any other communication scheme for wirelessly transmitting at least some of the information in at least a portion of a network of suitable wired/wireless technologies or protocols. Preferably, the node is selected from geographical position, mobile station, mobile device, user equipment, mobile user and network user. More preferably, the relationship between the nodes is selected from the information transmission relationship between the electronic network nodes, the transport relationship between geographic locations, the actual kinship between people, the friendship, follow, transaction or sending message relationship in the virtual social network. Preferably, the classification is selected from the network structure type. Structure type selected from the star, tree, fully connected and ring.

One embodiment implements a compound classification system provided by the present invention. The classification system implements compound classification based on any form of a map classification system as described before. The vertex of the graph is the atom of the compound. The edge is a chemical bond between the atoms. Preferably, the class is selected from the group consisting of activity, mutagenicity, carcinogenicity, catalytic activity etc. of the compound.

One embodiment implements a social network classification system provided by the present invention. The classification system implements social network classification based on any form of a graph classification system as described above. The vertices of which are entities of social networks, comprising, but not limited to, people, institutions, events, geographic locations in social networks. The edges of the graph are relationships between entities, comprising, but not limited to, friends, follows, Private letters, quotations, associations. The quotation refers to a person who be involved by using @.

One embodiment implements a computer system provided by the present invention. The computer system comprises any of graph feature extraction systems, graph classification system, the network structure classification system, the compound classification system, the social network classification system, or any of a plurality of types mentioned above.

Figure 9:
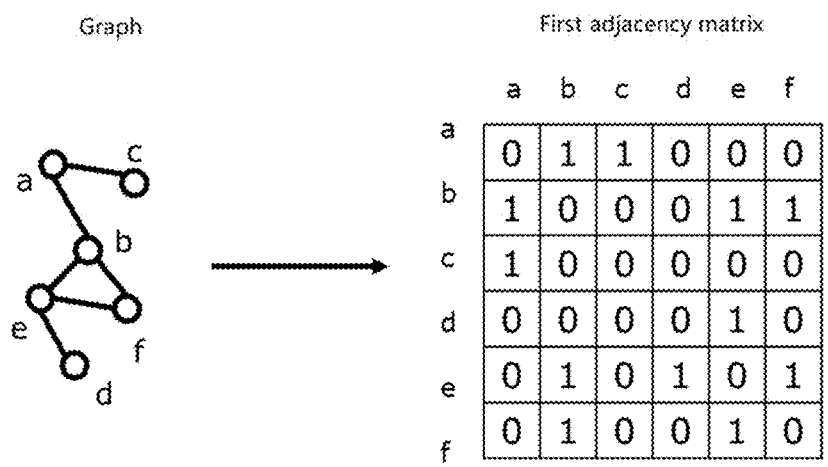
FIG. 9 is a graph and corresponding first adjacency matrix.

In addition, one embodiment takes a 6-vertex graph as an example to describe in detail a graph feature extraction system based on adjacency matrix in the computer environment of the present invention. For this 6-vertex graph, its vertices are denoted by a, b, c, d, e, f in alphabetical order, the six edges are (a, b), (a, c), (b, e), (b, f), (e, f) and (e, d) respectively. The graph structures and the its first adjacency matrix based on the order are shown in FIG. 9.

The connection information regularization module is configured to reorder all the vertices in the first adjacency matrix of the graph to obtain a second adjacency matrix, and the connection information elements in the second adjacency matrix are mainly distributed in a diagonal area of n of second adjacency, where n is a positive integer, n≥2 and n is much smaller than |V|, |V| is the number of rows or columns of the second adjacency matrix. The diagonal region of the second adjacency matrix is composed of the following elements: a positive integer i traverses from 1 to |V|, when n<i<|V|−n, select the elements from (i−n+1)-th to (i+n−1)-th columns in i-th row; when i≤n, select elements from 0-th to i+n−1th columns in the i-th row; when i≥|V|−n, select the elements from (i−n+1)-th to |V|-th columns in i-th row.

The vertex reordering method may be a greedy algorithm comprising the following steps:
(1) Initial Input: Input the first adjacency matrix A of the input graph as pending adjacency matrix.
(2) Swap Pairs Calculation: Calculate all possible vertex swap pairs in A. Label columns in A as 1 to 6, then all possible vertex swap pairs are pairs equal to {(m, h)|1<=m<=5, m+1<=h<=6}. So Specially, the pending matrix will be relabeled each time it is updated, then all possible pairs are reinitialized to 15 pairs. Init i=1, j=2.
(3) Row and Column Exchange: Judge whether i is equal to 5, if yes, then output A to obtain the second adjacency matrix, the greedy algorithm ends; otherwise, select pairs (i, j) as the current vertex exchange pair, execute swap (i, j), generate a new adjacency matrix and skip to step (4).
(4) Exchange Evaluation: Calculate the concentration of connection information elements in new adjacency matrix. If the concentration of connection information elements in the new adjacency matrix is higher than before, the refresh(A) is performed to replace A with the new matrix and jumps to step (2); if the concentration of connection information elements in the new adjacency matrix is lower than or equal to before. Then, the exchange is abandoned and execute j=j+1. If j>5, then execute i=i+1, j=i+1 and jump to step (3). If j≤5, then jump to step (3).

Figure 10:
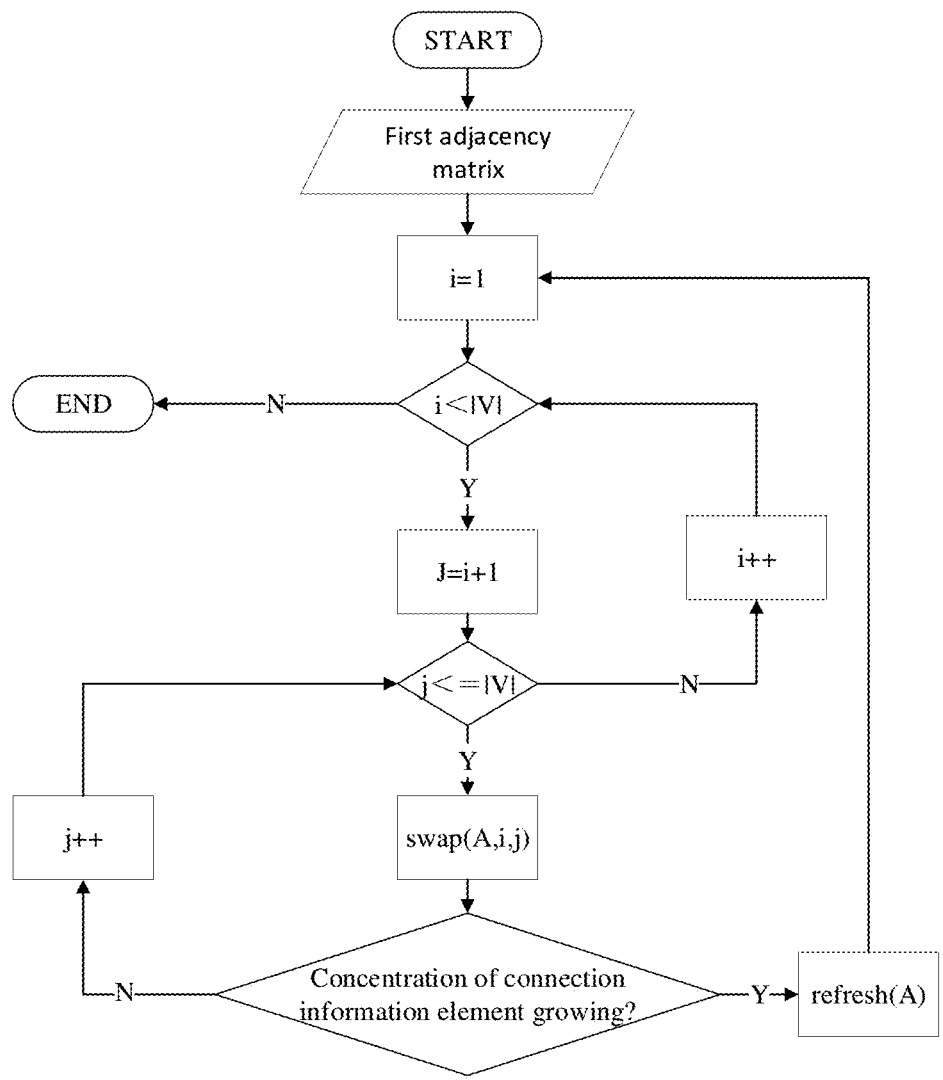
FIG. 10 is the flow diagram of greedy algorithm.

The specific flow chart is shown in FIG. 10, where swap (A, i, j) indicates that the rows and columns corresponding to i, j in the adjacency matrix A are exchanged at the same time to obtain a new adjacency matrix and refresh(A) indicates that the adjacency matrix accept the exchange.

The concentration of the connection information is measured by the loss value and ZR value. The calculation method is shown in the following formula. For example, in FIG. 13(*a*), Loss (A, 3)=0, ZR (A, 3)=12/24=0.5. In FIG. 13(*b*), Loss (A, 3)=2, ZR (A, 3)=10/24=5/12. The lower Loss or ZR is, the higher the concentration.

$$LS(A, n) = \sum_{i=1}^{n} \sum_{j=i+n}^{|V|} A_{i,j} + \sum_{i=n+1}^{|V|} \sum_{j=1}^{i-n} A_{i,j}$$

$$TC(A, n) = \sum_{i=1}^{n} \sum_{j=1}^{|V|-n+i-1} C_{i,j} + \sum_{i=n+1}^{|V|} \sum_{j=i-n+1}^{|V|} C_{ij}$$

$$T1(A, n) = \sum_{i=1}^{n} \sum_{j=1}^{|V|-n+i-1} A_{i,j} + \sum_{i=n+1}^{|V|} \sum_{j=i-n+1}^{|V|} A_{i,j}$$

$$ZR(A, n) = \frac{TC \times T1}{TC}$$

Taking the graph mentioned in FIG. 9 as an example, select n=3, and the corresponding two rows and two columns in the first adjacency matrix are exchanged as shown in FIG. 11. FIG. 11(*a*) is the input first adjacency matrix with Loss (A, 3)=4, ZR (A, 3)=16/24=2/3. FIG. 11(*b*) is a new adjacency matrix A' obtained by exchanging the rows and columns labeled as a and d. Its Loss (A', 3)=6, ZR (A', 3)=18/24=3/4, The Loss (A', 3)>Loss (A, 3), ZR (A', 3)>ZR (A, 3). That is, the concentration of connection information elements is reduced, so the exchange is abandoned. In FIG. 11(*c*) the new adjacency matrix A" is obtained by exchanging the rows and columns labeled as b and c, the Loss (A", 3)=2, ZR (A", 3)=14/24=7/12, Loss (A", 3)<Loss(A, 3),ZR (A", 3)<ZR(A, 3). The concentration becomes higher, so replace A with A". After constant trials, the best results can be obtained, as shown in the right adjacency matrix in FIG. 12 and the optimal result is the second adjacency matrix. At this point, the vertex order of the second adjacency matrix becomes c, a, b, f, e, d. All the connection information elements (with value "1") all fall into the second adjacency matrix with a width of n (n=3) in the diagonal area.

An important role of the connection information regulation module is that given a first adjacency matrix, there may be more than one way to reorder the vertices of the graph, and the concentrations are the lowest. Therefore, there is more than one second adjacency matrix, these second adjacency matrices are isomorphic. As shown in FIG. 13(*a*), both adjacency matrices are the second adjacency matrix obtained by connection information regularization module. All the connection information is in the diagonal area of width n (n=3) in the adjacency matrix. However, the order of the vertices of the two matrices is not the same, so there may be multiple second adjacency matrices. In the present invention, different isomorphic representations of the graph are generated using this isomorphic property. These isomorphic second adjacency matrices are used to increase the training set at the preprocessing stages in the deep learning process of the graph classification system.

The second adjacency matrix is input into the feature generation module to calculate and obtain at least one vector that directly corresponds to the subgraph structure supporting the classification. The feature generation module uses $n_0$>=1 filter matrixes with size n×n, and moves along the diagonal of the second adjacency matrix to perform a convolution operation as shown in FIG. 14. These filter matrices is denoted as $F^{O,i}$, i∈{1, ..., $n_0$}. Then the diagonal features extracted by the filter matrix $F^{O,i}$ in step j can be shown as:

$$P_{i,j}^0 = \alpha(\langle F^{O,i}, A_{[j:j+n,j:j+n]}^N \rangle) = \alpha\left(\sum_{p=1}^{n}\sum_{q=1}^{n} F_{p,q}^{O,i} A_{j+p,j+q}^n\right)$$

Where α(·) is the activation function as sigmoid. Therefore, the feature size obtained from diagonal convolution is $n_0$×(|V|−n+1). In the following description, $P^O$ is used to dente the feature {$P_{i,j}^O$} obtained by the feature generation module, and $F_O$ is used to denote the filter parameter {$F^{O,i}$}.

Taking the graph shown in FIG. 9 as an example, $n_0$=2 filter matrices with size 3×3 are used to calculate along the diagonal of second adjacency matrix, as shown in FIG. 15. FIG. 15(*a*) shows the graph and its second adjacency matrix. FIG. 15(*b*) shows the two filter matrices used. For convenience, the values in the filter matrix are 0 or 1, and the corresponding structures of two filter matrices used here are shown in FIG. 15(*c*). Using the above filter matrix in (b) to move along the diagonal direction of the second adjacency matrix, the calculation is to multiple bitwise and sum up, so a vector (4, 4, 6, 4) can be obtained. Similarly using the below filter matrix in (b) to move diagonally along the second adjacency matrix, another vector (4,4,4,4) can be obtained. That is, after filtering operations, two vectors can be obtained, as shown in FIG. 15(*d*), and another vector can be obtained through the activation function (Sigmoid) as shown in FIG. 15(*e*). The higher the values in the vectors of FIG. 15(*d*) and FIG. 15(*e*), the higher the probability that the structure of filter matrix appears in corresponding position in the graph. For example, the region corresponding to 0.99 in FIG. 15(*e*) is the area enclosed by the dotted line in FIG. 15(*a*), that is, the subgraph structure represented by the three vertices b, e, f and it is exact the same with the structure represented by the filter matrix (the structure above the FIG. 15 (*c*)).

The main advantage of the connection information regularization module is that the connection information is concentrated in the diagonal area of the second adjacency matrix. The elements that do not contain the connection information do not contribute significantly to the classification of the graph, which results in a significant reduction in the amount of computation of the system. Specifically, without a connection information regulation module, when the feature generation module uses a filter matrix of size n×n to extract features, each filter matrix needs to perform (|V|−n+1)² calculations. After connection information regularization module, when using a filter matrix of size n×n to extract features, each filter matrix requires only |V|−n+1 calculations. Take FIG. 14 as an example, set n=3 and after the connection information regularization module, the number of calculations to be performed by each filter matrix is reduced from (6−3+1)²=16 times to 6−3+1=4 times. The amount is only 25% of the original. It can be seen that the graph feature extraction system with a connection information regulation module has a much smaller computational cost than the graph feature extraction system without one. The former calculation amount is only 25% of the latter.

In addition, an embodiment is provided to describe in detail a specific implementation of the graph classification system based on adjacency matrix in a computer environment according to the present invention, and the effect of such an implementation is verified by public datasets.

For datasets with irregularly sized of graphs, we need to find a suitable window size n for it. When n is too small, it may lead to the loss of the most connection information element after passing through the connection information regularization module. In addition, small n may cause overfit of the feature generation module, because less subgraph structure features might be captured. First, we unified the sizes of the adjacency matrices of all graphs, and choose the largest number of vertices in the dataset $|V|_{max}$ as the size of the uniform adjacency matrix (number of rows or columns). For graphs with vertices less than $|V|_{max}$, such as the graph of 3 vertices, we use the zero-padding operation (addition of 0) to make the number of rows and columns of the adjacency matrix equal to $|V|_{max}$. At the same time, it also ensures that the existing connection information in the original graph is maintained, that is, the additional 0 does not destroy or change the original vertices and edges in the graph. The zero-padding operation is shown in FIG. 16. FIG. 16(a) shows the graph structure of the three-vertex graph and its adjacency matrix, we perform zero-padding on it to make the size of the adjacency matrix become 5, as shown in FIG. 16. (b).

When selecting n, a small number of graphs are chosen randomly from a given dataset. Then the connected information regularization module with different window sizes n is used to process the selected graphs and the Loss of the second adjacency matrices are compared. For the randomly selected graphs, the window size n that minimizes the average Loss of the second adjacency matrices is selected as the window size of the dataset.

Figure 30:
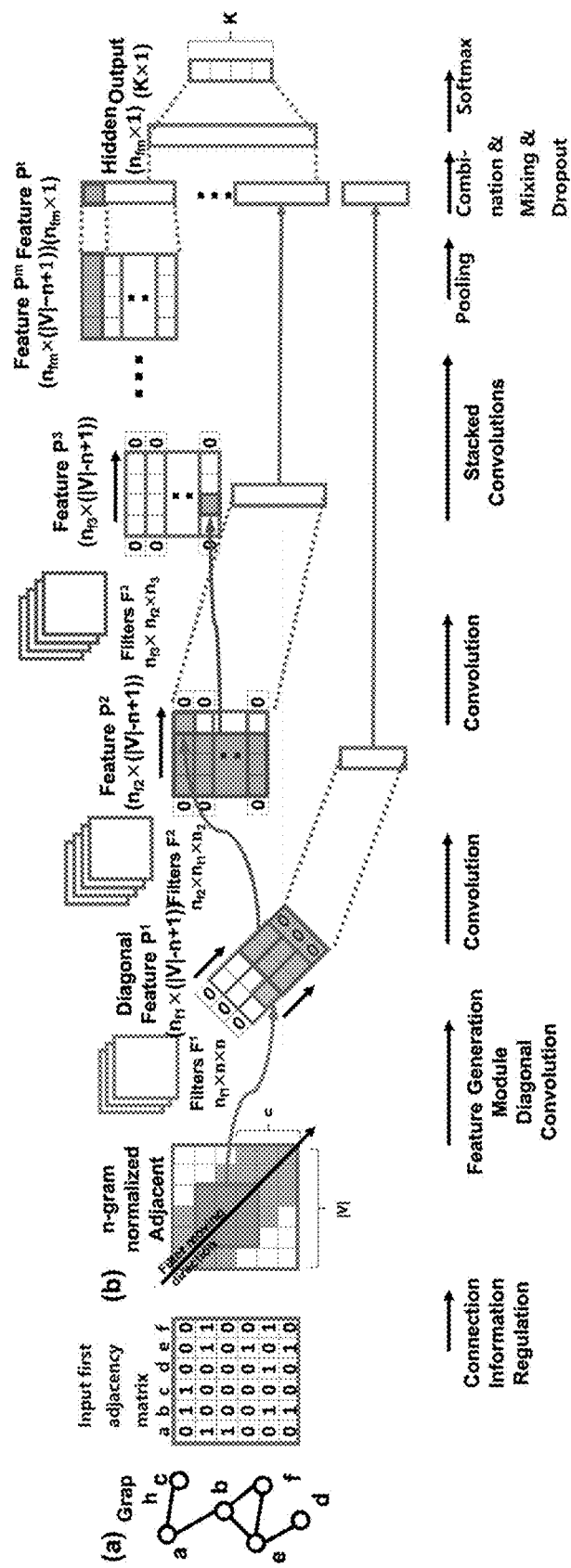
FIG. 30 is the structure of a graph classification system based on stacked CNN.

For each graph, after zero-padding is performed to get the first adjacency matrix, the first adjacency matrix is processed using the processing flow shown in FIG. 30. First the greedy algorithm in Embodiment 1 is used to regularize the connection information and generate features of graph. In the process of feature generation, $n_{f0}$ filter matrices are used to filter according to the way described in Embodiment 1 and output to the stacked CNN module. The first convolution result $P^1$ is obtained in the stacked CNN module through the first convolution submodule and the value of the vector represents the possibility that the subgraph structure appears at various positions in the graph. And then repeatedly adding more convolution submodules, we can get more convolution results $P^2, P^3, \ldots, P^m$. The deeper convolution submodule is, the larger and more complex the subgraph represented by the convolution result. Table 1 describes the size, number of filter matrices and the size of the generated features in each convolution submodule. The diagonal convolution represents the feature generation module, and the convolution layer m is the m-th convolution submodule. It should be noted that stacking each convolution submodule in CNN requires setting the height of the filter matrix (i.e. the number of rows in the filter matrix) the same as the number of filter matrix in the previous convolution submodule (i.e. the number of vectors output by previous convolution submodule). For example, for the convolution submodule 2, the filter matrix size is $n_1 \times s_2$, which means that the filter matrix height is the same as the number of filter matrixes (m) in the convolution submodule 1.

Formally, for i-th convolution layer, we take feature $P^{i-1}$ in size of $n_{i-1} \times (|V|-n+1)$ as input, extend it with zero-padding $(s_i-1)/2$ on the left and zero-padding $(s_i-1)/2$ on the right and get the $\hat{P}^{i-1}$ in size of $n_{i-1} \times (|V|-n+s_i)$. Then we apply $n_i$ filters $F^i$ in size of $(n_{i-1} \times s_i)$, and get the feature $P^i$. We define the elements of $P^i$ as follows:

$$P_{j,k}^i = \alpha(\langle F^{i,j}, \hat{P}_{[1:n_{i-1}, n:n+s_i-1]} \rangle)$$

In the formula, $\alpha(\bullet)$ denotes an activation function, such as sigmoid. And j, k denotes the position of the element in $P^i$, j-th row and the k-th column. $s_i$ denotes the width of the filter matrix in the i-th convolution layer, and $n_i$ denotes the number of filter matrixes in the i-th convolution layer.

TABLE 1

Configuration and Feature Size in Each Layer of Graph Classification System

| Steps | Number of Filter Matrix | Size of Filter Matrix | Zero-padding | Feature size |
|---|---|---|---|---|
| Input | | | | $|V| \times |V|$ |
| Diagonal Convolution | $n_{f0}$ | $n \times n$ | 0 | $n_{f0} \times (|V| - n + 1)$ |
| Convolution Layer 1 | $n_{f1}$ | $n_{f0} \times s_1$ | $s_1 - 1$ | $n_{f1} \times (|V| - n + 1)$ |
| Convolution Layer 2 | $n_{f2}$ | $n_{f1} \times s_2$ | $s_2 - 1$ | $n_{f2} \times (|V| - n + 1)$ |
| Convolution Layer 3 | $n_{f3}$ | $n_{f2} \times s_3$ | $s_3 - 1$ | $n_{f3} \times (|V| - n + 1)$ |
| ... | ... | ... | ... | ... |
| Convolution Layer m | $n_{fm}$ | $n_{f(m-1)} \times s_m$ | $s_m - 1$ | $n_{fm} \times (|V| - n + 1)$ |
| Pooling Layer | | | | $n_{fm}$ |
| Hidden Layer | | | | $n_{fm}$ |
| Output | | | | K |

After going deeper through the m convolution layers with system supplied parameter m, we obtain the deep feature set $P^0, \ldots, P^m$. Pooling submodule is applied to perform pooling operation on each convolution result and max-pooling is taken here. We add the pooling layer for each deep feature set $P^i$ where i from 0 to m. For $P^i$ whose size is $n_{i-1} \times (|V|-n+1)$, we take max-pooling on each row. Therefore, we get a vector of size $n_{i-1} \times 1$.

Figure 17:
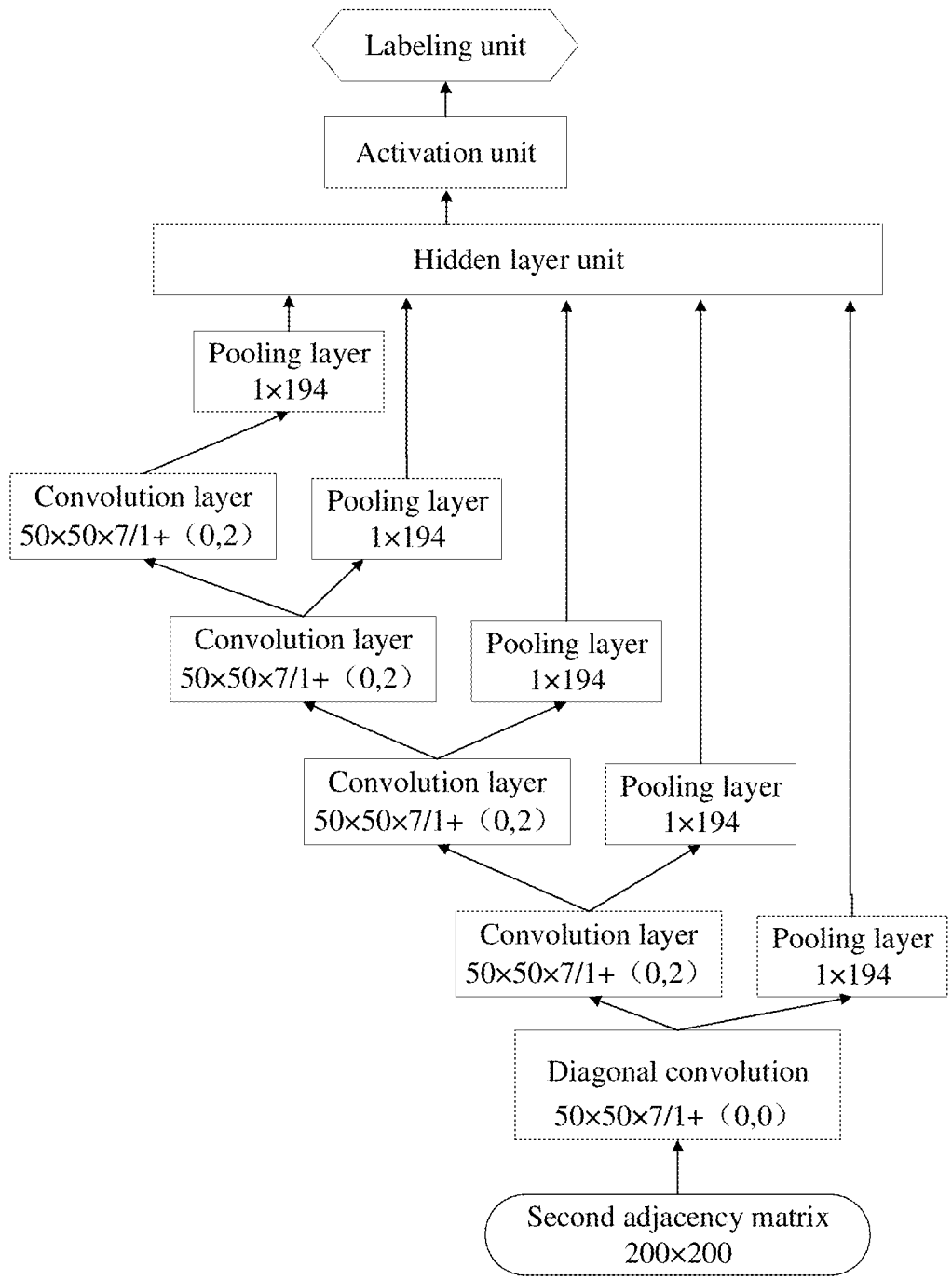
FIG. 17 is a schematic diagram of a graph classification system based on stacked CNNs.

FIG. 17 shows the relationship between convolution submodules and pooling submodules in a stacked CNN, where the arrows indicate the direction of data flow between the modules. The hidden layer unit is a fully connected layer. The neurons in the fully connected layer have a complete connection with all the activation values of the previous layer. The weight parameter $W_h$ and the bias parameter $b_h$ are set in this layer to calculate for the input and get the activation value. And the dropout is set to prevent the neural network from overfitting. The dropout refers to that in a deep learning network training process, the neurons are temporarily discarded from the network with a certain probability, and the dropout can effectively prevent overfitting.

In the classification unit, we perform multinomial logistic regression through another full connection on weight parameter $W_s$, bias parameter $b_s$ and softmax function. The softmax function computes the probability distribution over the vector x of class labels and labels the graph with the label corresponding to highest probability in the result.

The neural network training in the system is achieved by minimizing the cross-entropy loss. Its formula is:

$$C = -\log \prod_{i=1}^{|R|} Pr(y_i | \mathcal{A}_i)$$

Where $|R|$ is the total number of graphs in the training set R, $A_i$ denotes the adjacency matrix of the i-th graph in R, $y_i$ denotes the i-th class label in x. The parameters are optimized with stochastic gradient descent (SGD). The back-propagation algorithm is employed to compute the gradients.

In order to evaluate the effect of the present invention, five open graph datasets were used for testing. Three bioinformatics datasets: MUTAG, PTC and PROTEINS are used in experimental evaluation. MUTAG is a dataset with 188 nitro compounds where classes indicate whether the compound has a mutagenic effect on a bacterium. PTC is a dataset of 344 chemical compounds that reports the carcinogenicity for male and female rat. PROTEINS is a collection of graphs, in which nodes are secondary structure elements and edges indicate neighborhood in the amino-acid sequence or in 3D space. In addition, two social network datasets, IMDB-BINARY and IMDB-MULTI, are also used in the experimental comparison. IMDB-BINARY is a movie collaboration dataset where actor/actress and genre information of different movies are collected on IMDB. For each graph, nodes represent actors/actress and the edge connected between them if they appear in the same movie. The collaboration network and ego-network for each actor/actress are generated. The ego-network is labeled with that the genre it belongs to. IMDB-MULTI is the multi-class version since a movie can belong to several genres at the same time. IMDB-BINARY is the binary class version which has the set of ego-networks derived from Comedy, Romance and Sci-Fi genres.

Based on the above data sets, two different implementations of the stacked CNN-based graph classification system of the present invention are used for verification. The first implementation uses one independent pooling module and one convolution pooling module; The second graph classification system uses an independent pooling module and four convolution submodules. We set a parameter n from 3 to 17. Also, the filter size $s_i$ used at each convolution layer is tuned from {3, 5, 7, 9, 11, 13, 15, 17, 19}. The number of convolution filters is tuned from {20, 30, 40, 50, 60, 70, 80} at each layer. The convergence condition is set to the accuracy difference of less than 0.3% from the previous iteration at the training phase or the number of iterations exceeding 30. The test set and training set are randomly sampled based on the ratio of 3:7 in each experiment.

Given the test collection of graphs in size of N, each graph $G_i$ with class label $y_i$ and predicted class $\hat{y}_i$ by classifier, the accuracy measure is formalized as follows:

$$Accuracy = \frac{\sum_{i=1}^{N} \delta(y_i = \hat{y}_i)}{N}$$

where the indicator function $\delta(\cdot)$ gets value "1" if the condition is true, and gets value "0" otherwise.

Comparing the present invention with three representative methods: DGK (Deep graph kernels, Proceedings of the 21th ACM SIGKDD International Conference on Knowledge Discovery and Data Mining. ACM, 2015: 1365-1374), PSCN (Learning convolutional neural networks for graphs, Proceedings of the 33 rd International Conference on Machine Learning, New York, N.Y., USA, 2016, 2014-2023) and MTL (Joint structure feature exploration and regularization for multi-task graph classification, IEEE Transactions on Knowledge and Data Engineering, 2016, 28(3): 715-728). Table 2 shows the characteristics of the five datasets used and summarizes the average accuracy and standard deviation of the comparison results. All the examples were run ten times in the same setup.

TABLE 2 properties of the datasets and accuracy for invention and 3 state-of-the-art approaches

| Datasets | MUTAG | PTC | PROTEINS | IMDB-BINARY | IMDB-MULLTI |
|---|---|---|---|---|---|
| Number of Graphs | 188 | 344 | 1113 | 1000 | 1500 |
| Number of Classes | 2 | 2 | 2 | 2 | 3 |
| Max Vertices Number | 28 | 109 | 620 | 136 | 89 |
| Avg Vertices Number | 17.9 | 25.5 | 39.1 | 19.77 | 13 |
| DGK | 82.94 ± 2.68 (5 s) | 59.17 ± 1.56 (30 s) | 73.30 ± 0.82 (143 s) | 66.96 ± 0.56 | 44.55 ± 0.52 |
| PSCN | 92.63 ± 4.21 (3 s) | 60.00 ± 4.82 (6 s) | 75.89 ± 2.76 (30 s) | 71.00 ± 2.29 | 45.23 ± 2.84 |
| MTL | 82.81 ± 1.22 (0.006 s) | 54.46 ± 1.61 (0.045 s) | 59.74 ± 2.11 (0.014 s) | 59.50 ± 3.23 | 36.53 ± 3.23 |
| The First Graph Classification System | 92.32 ± 4.10 (0.01 s) | 62.50 ± 4.51 (0.10 s) | 74.99 ± 2.13 (0.39 s) | 63.43 ± 2.50 | 46.22 ± 1.15 |
| The Second Graph Classification System | 94.99 ± 5.63 (0.01 s) | 68.57 ± 1.72 (0.08 s) | 75.96 ± 2.98 (0.60 s) | 71.66 ± 2.71 | 50.66 ± 4.10 |

For dataset MUTAG, compared with the best result of PSCN at 92.63%, the second graph classification system (5 convolution layers) obtained the accuracy of 94.99%, higher than PSCN. The first graph classification system achieved the accuracy of 92.32%, which is very similar to PSCN. For PTC dataset, DGK and PSCN obtained similar accuracy measure of around 60%. The first graph classification system achieved 62.50% and the second graph classification system achieved 64.99%, which is the best accuracy to date on this dataset, with the best of our knowledge. For dataset PROTEINS, the second graph classification system achieved the highest accuracy of 75.96%, which is slightly higher than the best result of 75.89% by PSCN. For the two social network datasets, the present invention has a competitive accuracy result of 71.66% for IMDB-BINARY, higher than the best of PSCN at 71.00% and has achieved the highest accuracy of 50.66% for IMDB-MULTI, compared to the best of PSCN at 45% and the best of DGK at 44%.

Study the impact of parameter configuration on the accuracy of the classification result and the time complexity performance of present invention.

Figure 18:
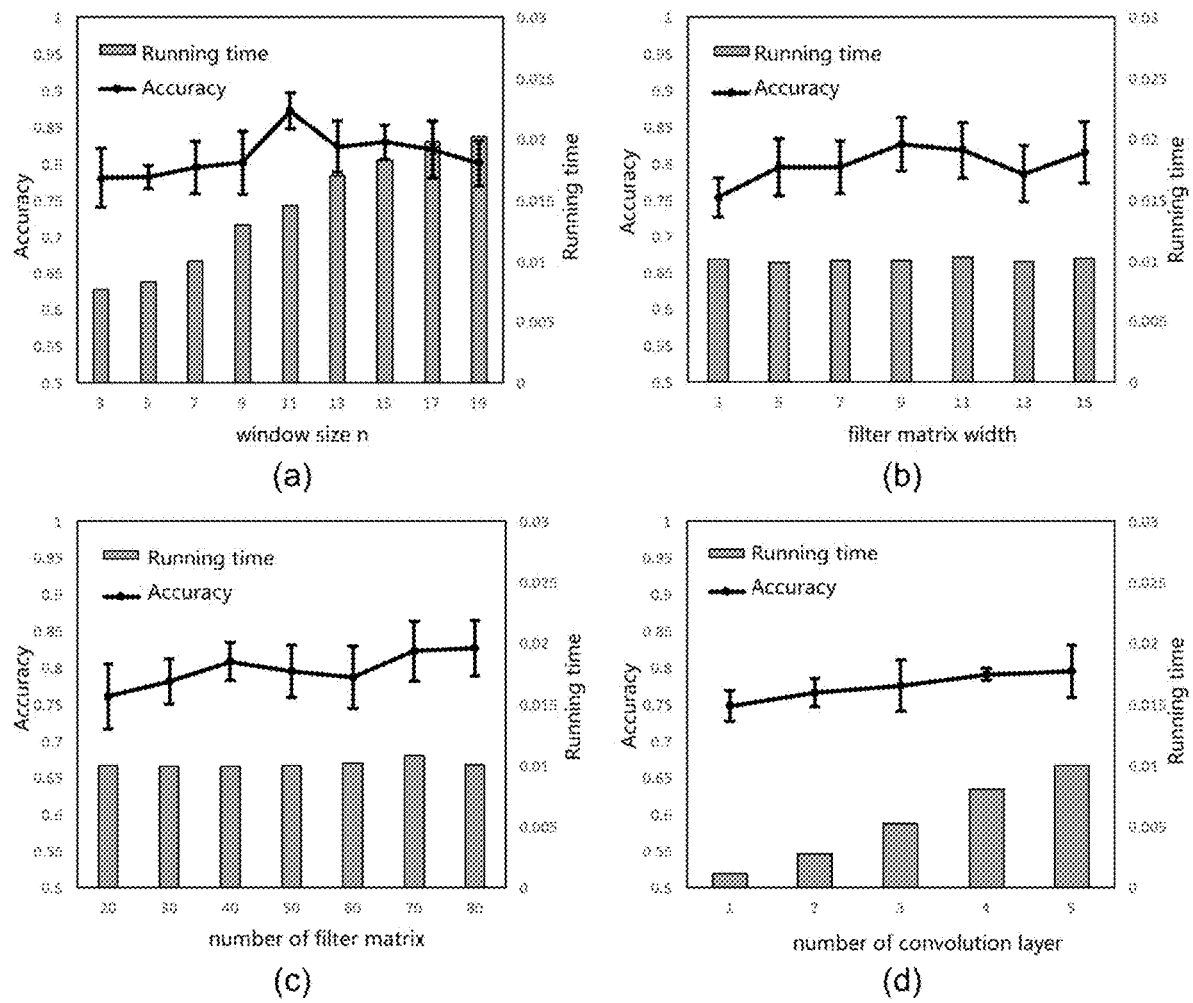
FIG. 18 is the accuracy and running time on MUTAG.

Window Size n:

This is the key parameter for determining how good the system of present invention can cover the most significant subgraph patterns in the given graph dataset. The reason is that a small n may result in the fact that most graphs would fail to concentrate all connection information into the diagonal area with width n. Consequently, we may loss more structural connectivity information, which can be critical for classification of graph dataset. On the other hand, a big n will lead to high computation cost and time complexity. FIG. 18(a) shows the accuracy and executing time of present invention varying n on dataset MUTAG. In this experiment, the number of convolution filters is set to 50 for all experiments and the stacked convolution filter width is set to 7. The accuracy and execution time are both the average value in 10 runs with the same experimental setting. From both FIG. 18(a), FIG. 19(a) and FIG. 20(a), we observe that the accuracy is insensitive to the increase of n while the execution time is more sensitive and grows significantly as the parameter n increases from 3 to 11 for both MUTAG dataset and PTC dataset. Thus, setting smaller n is more desirable. From Table 2, we can see that the maximum number of vertices in PTC is 109, the average number of vertices is 25.5, the maximum number of vertices in PROTEINS is 620, the average number of vertices is 39.1, and the window size n is 3 to 11, so the choice of n will be far less than the number of vertices of the graph |V|.

Figure 19:
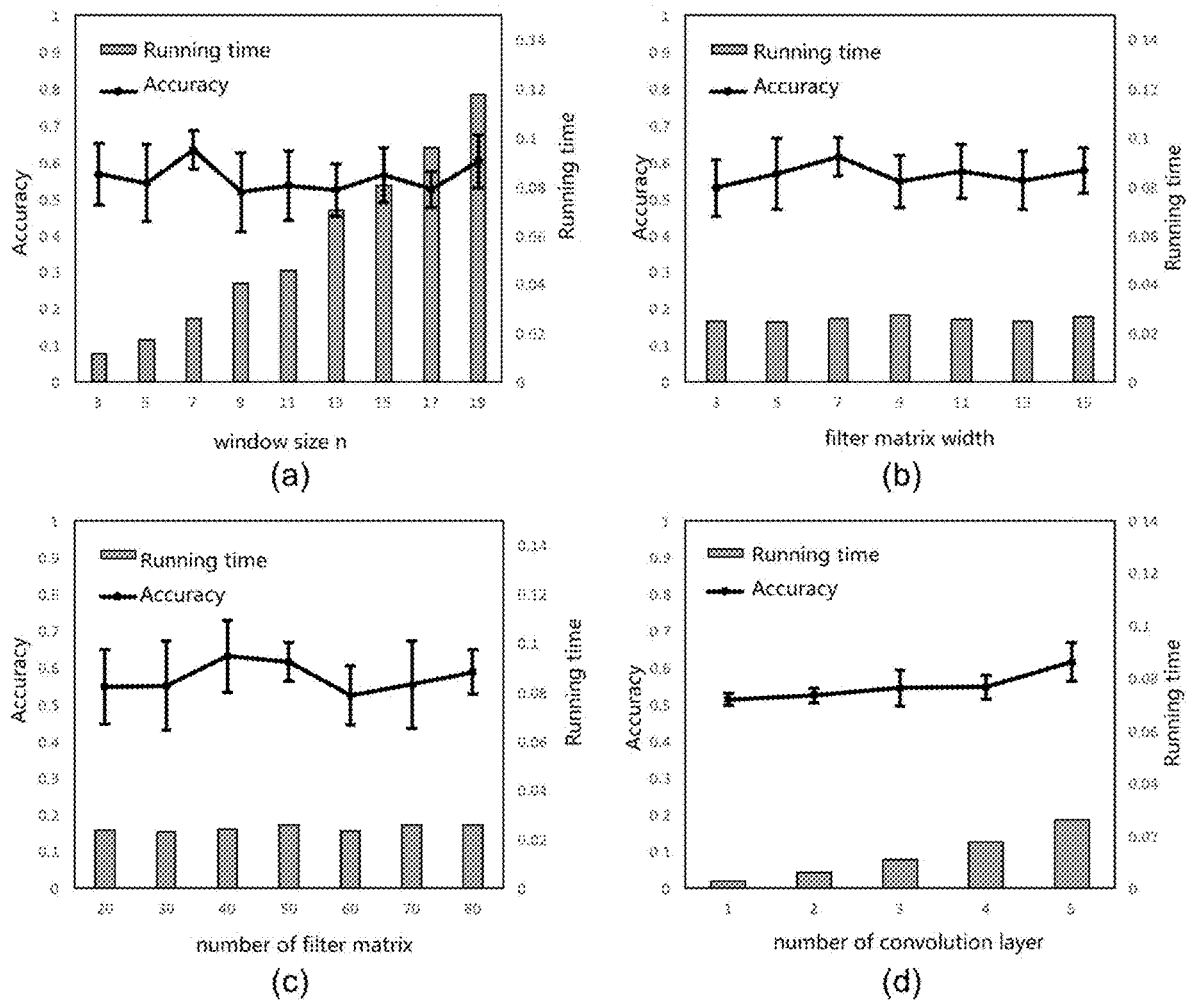
FIG. 19 is the accuracy and running time on PTC.
Figure 20:
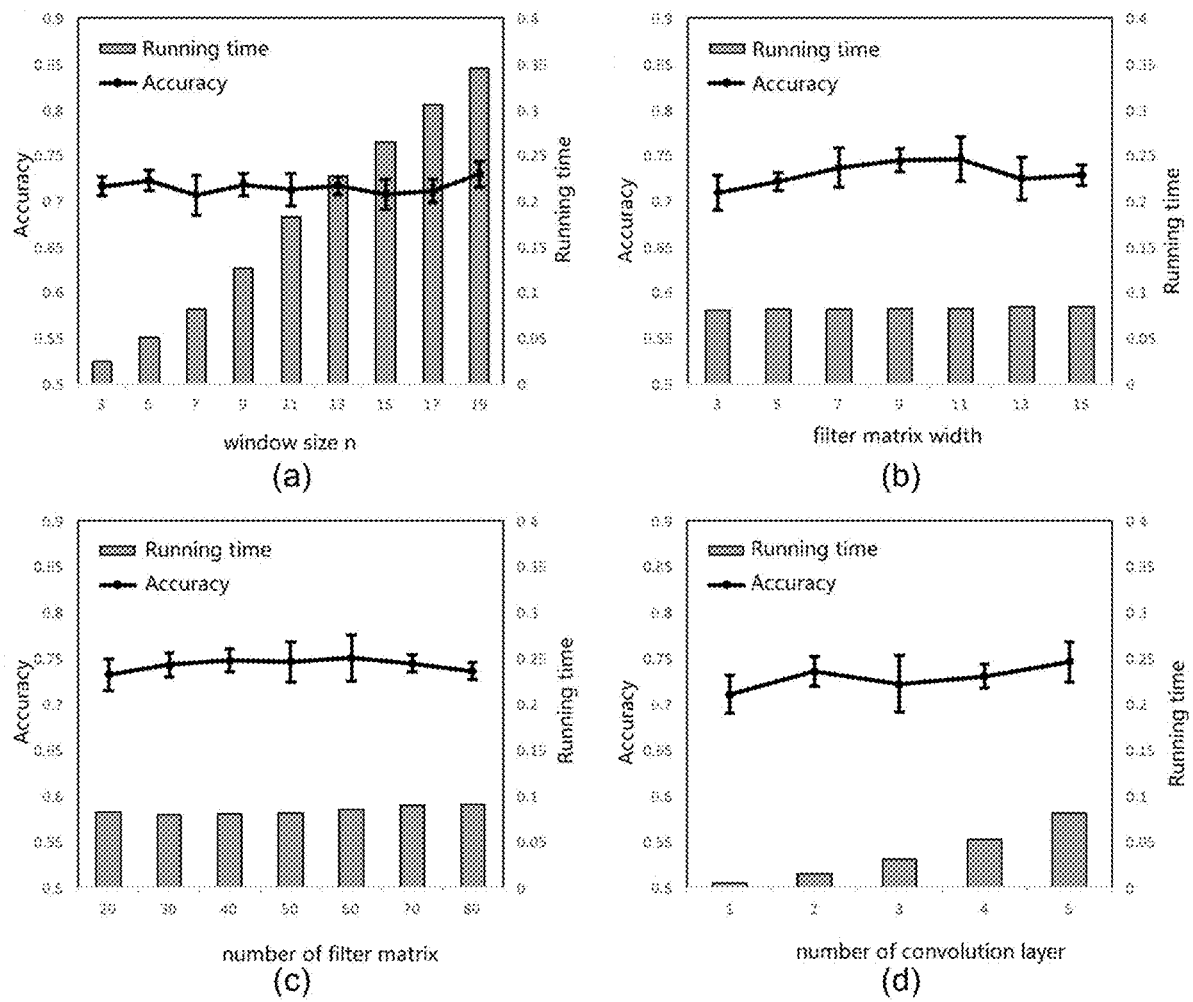
FIG. 20 is the accuracy and running time on PROTEINS.

Stacked Convolution Filter Width $s_i$:

For convenience, we set the same width for all layers to simple the discussion. Setting a larger width $s_i$ means that each filter can capture more complex subgraph structure features. Also, the complex subgraph structure features have higher possibility in combination. However, it is also difficult to determine the filter width to cover all the possible combinations. In this embodiment, we set n=7, filter number by 50 and vary filter width from 3 to 15. Note that due to zero-padding, we can only use the filter with odd value, namely 3, 5, 7, 9, 11, 13, 15. We also performed 10 runs for each measurement collected under the same setting and take the average value in accuracy and executing time. FIG. 18(b), FIG. 19(b) and FIG. 20(b) illustrate the results on MUTAG, PTC and Proteins respectively. It shows that on MUTAG, the accuracy grows as we increase filter width from 3 to 9 and become more stable as we increase the filter width from 9 to 15. This indicates that 9 is an approximately optimal setting of filter width because the running time on 9 is smaller than that on the filter width of 9 and 15. Similar to MUTAG, PTC dataset shows that the best setting of the filter width is 7, because setting filter width as 911 and 13 respectively gets similar accuracy but takes longer running time compared to small filter width of 7. While in Proteins dataset, namely FIG. 20(b), we can see that optimal filter width is 11.

Filter Number $n_{f_1}$

Like filter width, we set the same filter number for all convolution layers, comprising diagonal convolution layer and stacked convolution layers. In this experiment, we set n by 7, filter width by 7 and vary filter number from 20 to 80. Each measurement is collected by 10 runs and the average value of accuracy and running time are reported. FIG. 18(c) shows the result on MUTAG and FIG. 19(c) shows the result of PTC. And FIG. 20(c) shows the result in PROTEINS. We make an interesting observation: a larger filter number, for example, 60 in FIG. 19(c), may result in much worse classification accuracy for both datasets. This is because the more filters are used, the more weights need to be trained. Thus, it is easier to get over-fitted in training with larger filter number.

Convolution Layer Number

To better observe the efficiency and effectively of present invention on different convolution layer number, the number of convolution layers on the MUTAG, PTC, and PROTEINS is set to 1 to 5 in this embodiment. FIG. 18(d), FIG. 19(d) and FIG. 20(d) illustrate the accuracy and executing time of our approach on MUTAG, PTC and Proteins, respectively. Note that in this embodiment, all other parameters are fixed as the default value. n and filter width are set as 7, filter number is set as 50. An interesting fact is that, without tuning other parameters, increasing convolution layer number will not increase the accuracy explicitly. In FIG. 18(d), the accuracy on 5-convolution layer is similar to 2-convolution layer version. It is because without increasing the filter number and filter width, the deeper convolution network cannot take advantage of its capacity in representing more complex features. In FIG. 20(d), the accuracy on 5-convolution layer is even worse than 2-convolution layer version. It means that the current parameter setting in n, filter width and number works well on 2-convolution layer and limits the performance on 5-convolution. Therefore, in this situation, we need enlarge the other parameters for 5-convolution layer version on PROTEINS dataset.

Dropout Ratio

Figure 21:
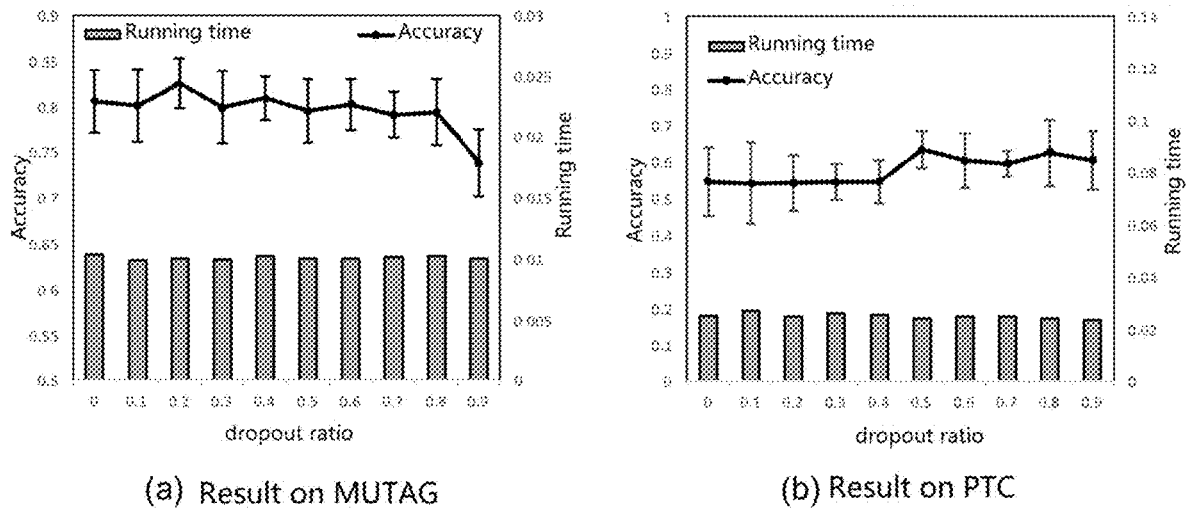
FIG. 21 is the accuracy and running time on different dropout ratio.

The previous embodiments have shown that increasing the filter matrix width, filter matrix size and number of convolution layers may not improve performance. The next set of embodiments investigates the effect of overfitting by using the dropout ratio in batch normalization. The batch normalization is a technique for maintaining the same distribution of input of each layer of the neural network during the deep neural network training process, which can help the neural network to converge. FIG. 21 shows the results on MUTAG and PTC. The x-axis varies the dropout ratio, the left y-axis measures the accuracy and the right y-axis measures the running time. FIG. 21(a) shows that the accuracy increases when the dropout ratio is from 0 to 0.2 and the accuracy reduces when the dropout ratio is from 0.2 to 0.9 for MUTAG. FIG. 21(b) shows the measurements for PTC: the accuracy is stable when dropout ratio is from 0 to 0.4, increases when the dropout ratio is from 0.4 to 0.5, and decreases slightly when the dropout ratio is from 0.5 to 0.9. This set of experiments indicates that when the dropout ratio is set to 0.2, the present invention gets the best fit on MUTAG and the optimal dropout ratio for PTC is 0.5.

Figure 22:
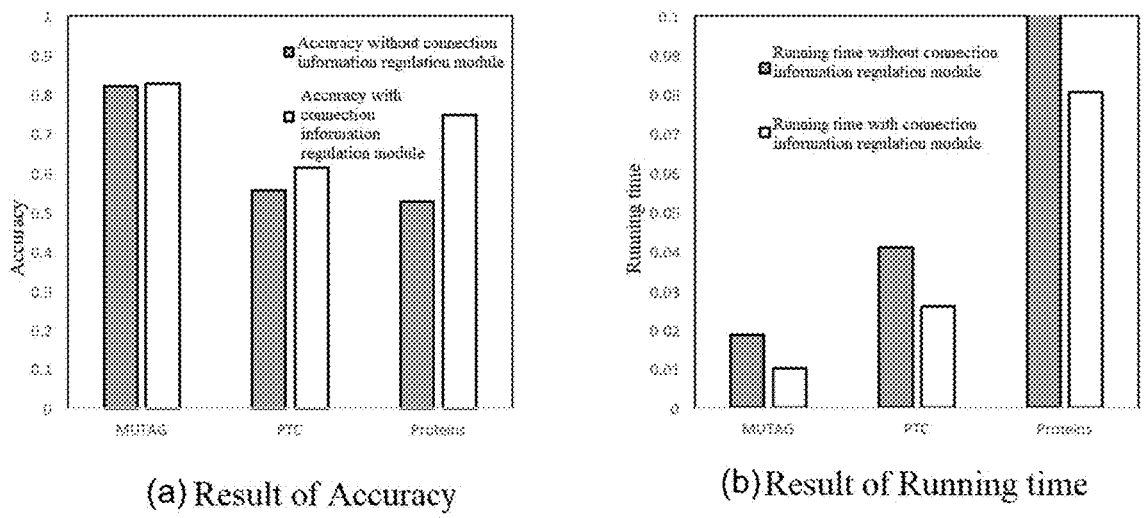
FIG. 22 is the accuracy and running time with/without connection information regulation module on different datasets.

The present invention proposes a graph feature extraction system based on adjacency matrix, concentrating the connection information elements in an adjacency matrix and extracting features. The invention is compared here with naïve CNN without connection information regulation module. For naïve CNN, a 2-dimension convolution layer is applied on adjacency matrix and the pooling layers are 2-dimension pooling. The configuration of the embodiment is n=7, filter width as 7 and filter number as 50, for both present invention and naive version. The results are reported in FIG. 22. FIG. 22(a) is the accuracy on these two approaches. We can see that the accuracy of present invention gets higher. In FIG. 22(b), the computing time of naive without regulation module version is larger than present invention. It means that the present invention gets a higher accuracy and lower running time.

Convergence

Figure 23:
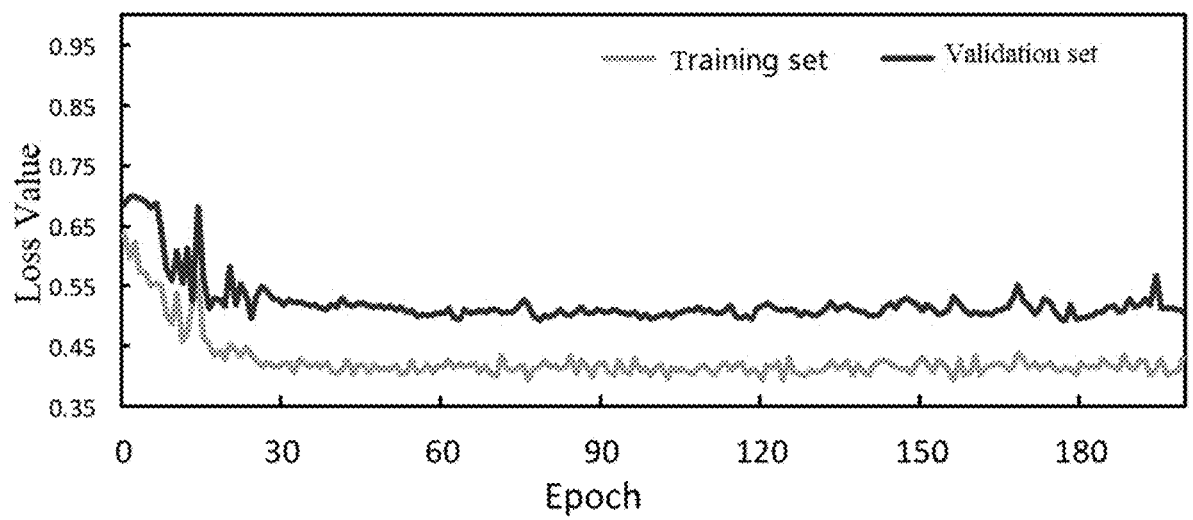
FIG. 23 is the convergence curve on MUTAG.
Figure 24:
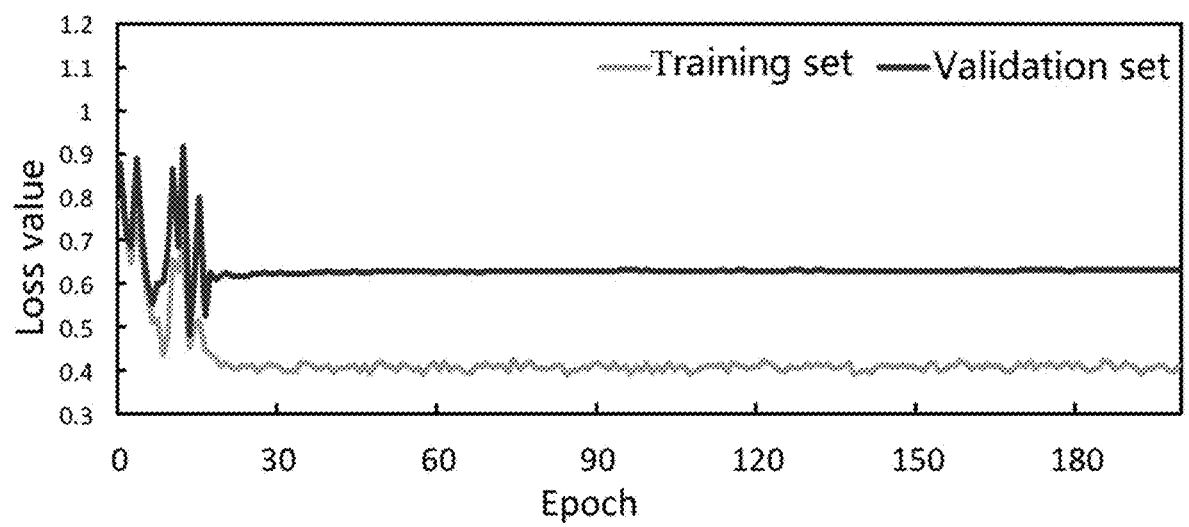
FIG. 24 is the convergence curve on PTC.
Figure 25:
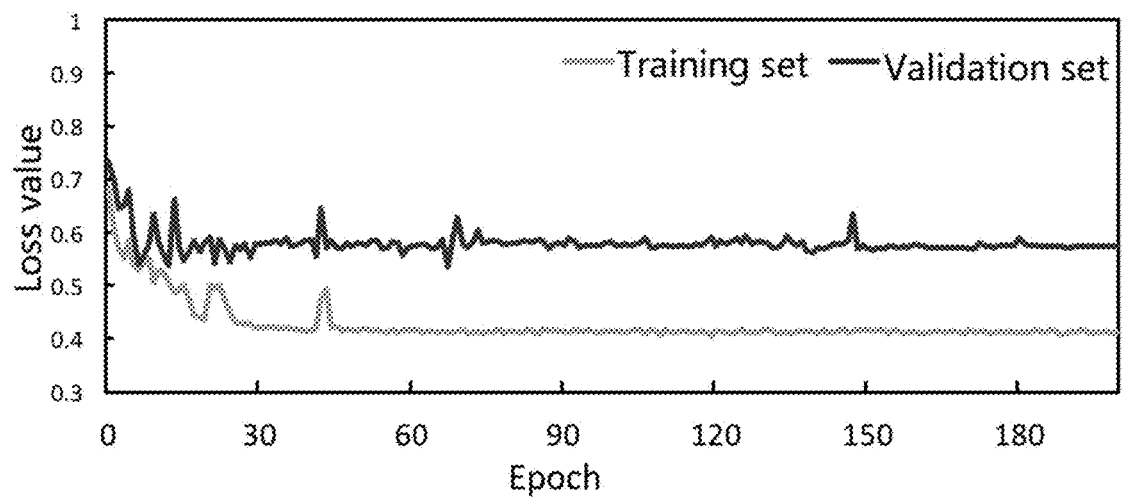
FIG. 25 is the convergence curve on PROTEINS.

FIGS. 23, 24, and 25 are the loss convergence process on training and validation set for MUTAG, PTC and PROTEINS. The grey line is the loss on training set and blue line is loss on validation set. It can be seen that in both three datasets, the loss reduces at first and get stable from 30 epochs. And just like most machine learning approaches, especially neural network, the loss on training set can get a lower value than validation set. The reason is that the training procedure applies Stochastic Gradient Descent on loss of training set not the validation set.

Feature Training

Figure 26:
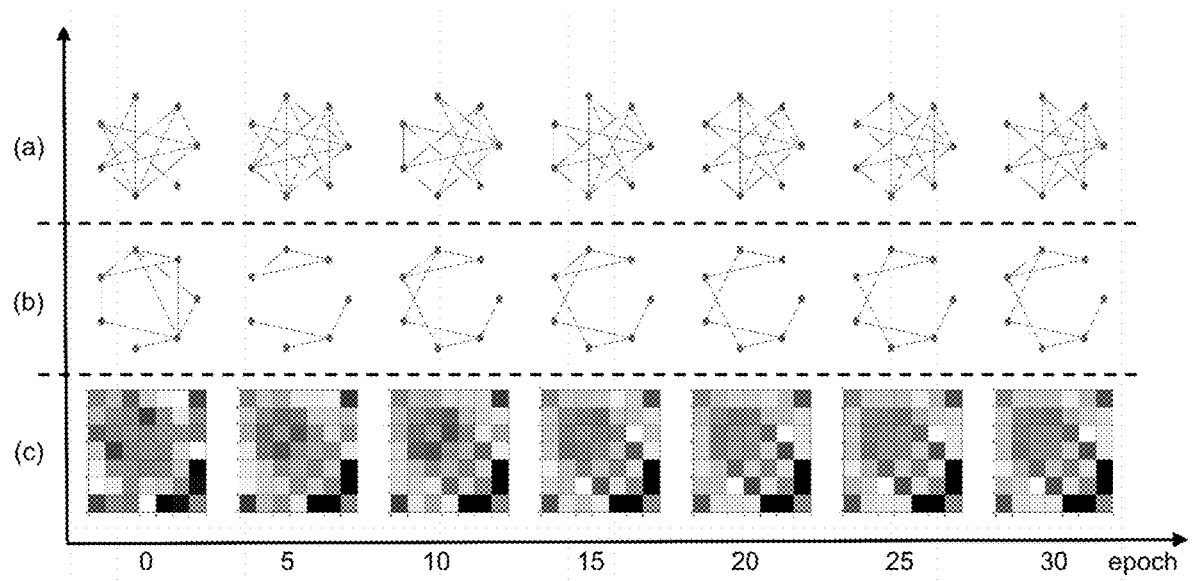
FIG. 26 is a filter matrix and its corresponding subgraph structure, where (a) is the positive subgraph structure, (b) is the negative subgraph structure, and (c) is the filter matrix.

This embodiment is performed on the MUTAG dataset, with n set to 7, filter width set to 7 and filter number set to 20. FIG. 26 reports the results, in which the x-axis is the epoch number from 0 to 30. Epoch=0 means the initial value, which is sampled randomly from a Gaussian distribution. FIG. 26 (c) shows the raw filter value, which is a 7×7 matrix. Each cell represents the corresponding position in the filter matrix. The darker the cell is, the bigger the value is. In other words, the darkest cell has the value closer to 1 while the white cell has the value closer to −1, the grey cell has the value around 0. In initial stage, more cells are grey, with values around 0. As moving forward with the training procedure, some dark cells become lighter and some light cells become darker, especially in the left top part. While the darkest cells, on the right bottom part, keep dark during the training. It means that these cells play important roles in classification of the given dataset of graphs. This is because the back propagation only modifies the cells that are non-contributing o the classification of the input graph. For better understanding the subgraph structure, FIG. 16 draws the positive subgraph and negative subgraph in FIG. 16(a) and FIG. 16(b) respectively. The positive subgraph is drawn by setting the cell as 1 if its value is bigger than 0 and as 0 if its value is smaller or equal to 0. This subgraph is called a positive subgraph because it represents the edges that should appear. In the contrast, the negative subgraph is drawn by setting the cell as 1 if its value is smaller or equal to 0 and as 1 if its value is bigger than 0. The negative subgraph denotes the edges that should not appear. It can be seen that, both positive graph and negative graph do change gradually from the initial state in the training procedure and arrive at the stable structures at the end of the training. It means that the training procedure eventually reaches the convergence.

Feature Visualization

Figure 27:
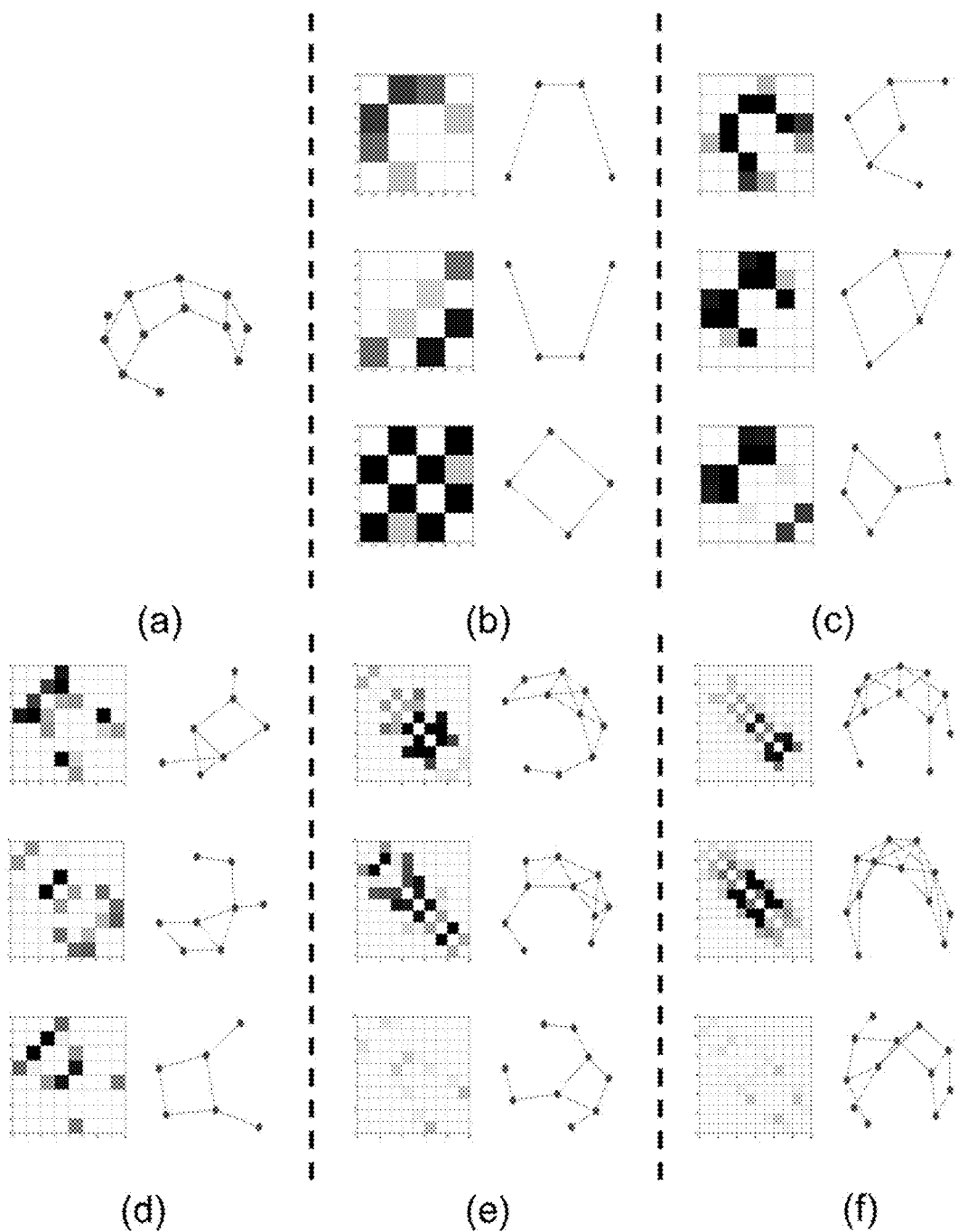
FIG. 27 is a schematic diagram of the subgraph structure corresponding to the features captured by each convolutional layer, where (a) is a 12-vertices graph, (b) is an extracted 4-vertices feature, (c) is an extracted 6-vertices feature, and (d) It is an extracted 8-vertices feature, (e) is an extracted 10-vertices feature, and (f) is an extracted 12-vertices feature.

FIG. 27 illustrates the subgraph features captured in different convolution layers. FIG. 27(a) presents the input graph of 12 vertices. In this embodiment, the second classification system (5 convolution layer) is used, with the window-size of n=4, the diagonal convolution filer of size 4×4 and the rest 4 convolution layer filters in size of 3. Thus, the feature size in each layer is 4, 6, 8, 10, 12. FIGS. 27(b), (c), (d), (e), (f) show the patterns learned at each of the five convolution layers respectively. The adjacency matrix shows the existing probability of each edge, the darker the cell is, the higher probability that the corresponding edge is captured by this filter. In the first layer shown in FIG. 27(b), only the basic four vertex patterns can be handled. Moving forward to the second layer shown in FIG. 27(c), the filters can capture and represent the six-vertex patterns, which are composed by the first layer features. By further adding more convolution layers, the more complicated subgraph patterns can be captured and represented. Finally, in FIG. 27(f), the 12-vertex feature is captured, which is quite like the original input graph in FIG. 27(a).

Finally, an embodiment is provided to mainly explain the important feature of the graph classification system based on adjacency matrix proposed by the present invention: capture a large multi-vertex subgraph structure using a smaller window.

Figure 28:
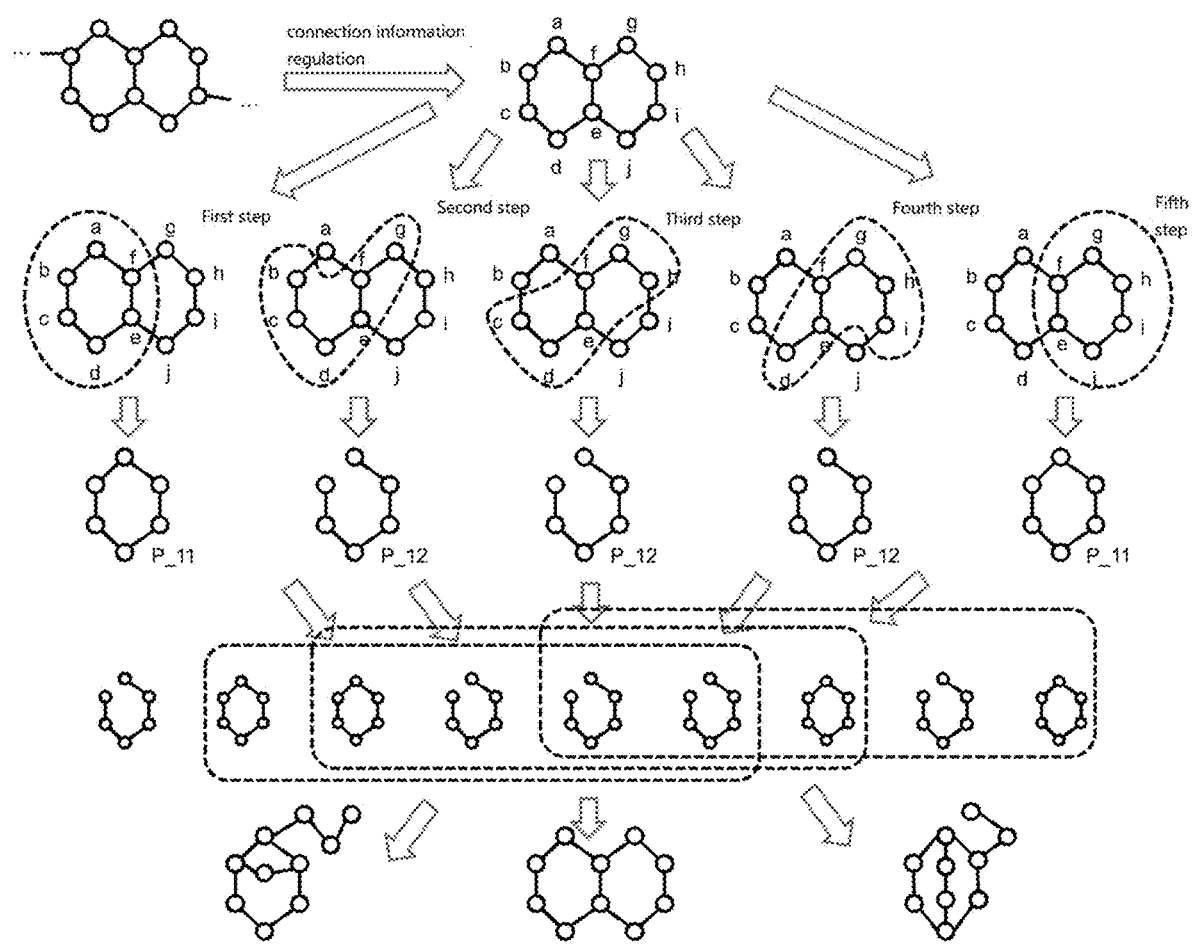
FIG. 28 is a schematic diagram of the physical meaning of the feature generation module.

Taking a graph consisting of ten vertices (|V|=10) as an example, FIG. 28 shows the physical meaning of using the feature generation module on this graph. It is observed that the graph has two rings of size six vertices, and two vertices are shared by these two ring structures. To capture such a ring-based graph pattern, existing approaches usually require having the window size larger than 10. However, the method of present invention can be effective even when the window size n is as small as six. Consider the original graph on the top left in FIG. 28, we sort the vertices by the connection information regulation module with n=6 and get the order labeled graph on the top right. We use "abcdefghi" to denote the sequence of sorted vertices. Then diagonal convolution with filters in size of 6×6 is performed, namely n=6. The filter can move by |V|−n+1=10−6+1=5 steps. The five figures in the center of FIG. 28 shows how each of the five filters covers (captures) the different patterns of the graph in each step. For example, in the first step, the filter stops at A n and it covers all the connections [1:6,1:6] between any pair of vertices marked by a, b, c, d, e, f. As shown in step 1 of FIG. 28, the filter highlighted by the dash line, covers the ring consisting of vertices a, b, c, d, e, f. More interestingly, using the diagonal convolution operation, different subgraph structures (features) can be captured by the same filter. For instance, steps 1 and 5 capture the same graph structure: the six-vertex ring. At the same time, steps 2,3 and 4 capture another same type of graph structure: the six-vertex line.

Figure 29:
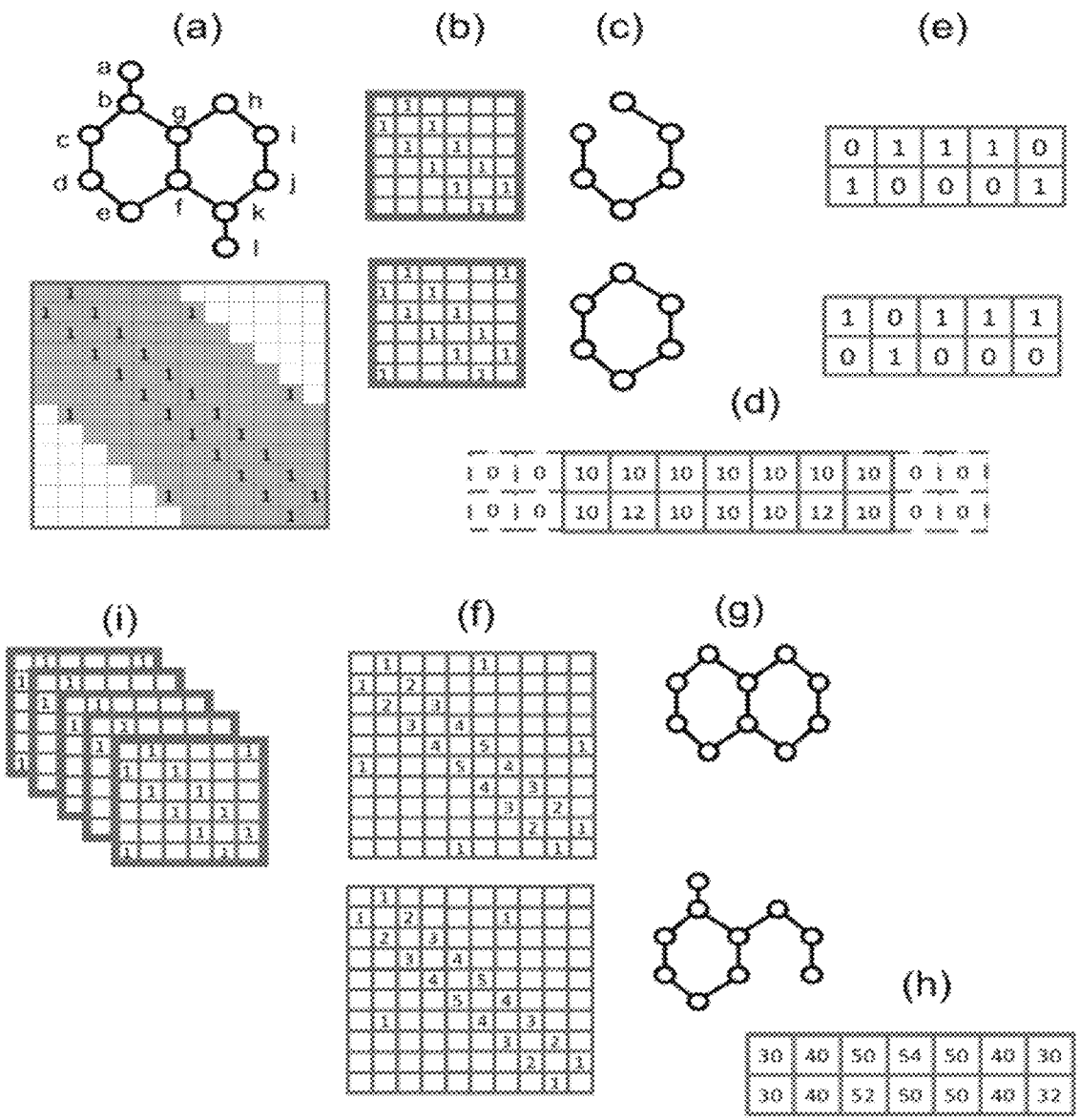
FIG. 29 is a schematic diagram of a subgraph structure captured by feature generation module and stacked CNN module.

More specifically, FIG. 29 gives a numerical example to describe the features captured by the feature generation module and the features captured in the stacked CNN. FIG. 29(a) shows a 12-vertex graph and the second adjacency matrix of the graph. The graph contains two rings of six vertexes, and the two vertexes are shared by the two ring structures. The elements of the adjacency matrix and the filter matrix blank in FIG. 29 indicate that the value is 0. In order to simplify the calculation of the values of the elements in the filter matrix, 0 or 1 is selected. FIG. 29(b) shows two filter matrices in the feature generation module and the corresponding subgraph structure is shown in FIG. 29(c). Using the two filter matrices of FIG. 29(b) to perform filtering operations along the diagonal of the second adjacency matrix of the graph, the vector can be calculated as shown in FIG. 29(d). The elements enclosed by the dashed lines are zero-padding. The filter matrix in the stacked CNN is shown in FIG. 29(e). To simplify the calculation, the elements are also 0 or 1. Using the filter matrix in the stacked CNN to filter the captured features (FIG. 29(d)), the resulting vector is shown in FIG. 29(h). Considering the physical meaning represented by the stacked filter matrix in CNN, it represents the combination of the subgraph structures captured by the feature generation module. Therefore, the filter matrix of the feature generation module can be stacked according to the value of the filter matrix in the stack CNN. FIG. 29 (i) shows. An adjacency matrix represented by a filter matrix in a stacked CNN is obtained as shown in FIG. 29(f). FIG. 29(g) is a subgraph structure represented by a filter matrix in a stacked CNN. It can be seen that in FIG. 29(g), a double ring with ten vertices and one with six vertex rings and 4 vertices.

The graph classification system based on adjacency matrix proposed by the present invention can capture large multi-vertex subgraph structure and deep features of the implicit correlation structure from the vertices and edges through a smaller window, thereby improving the classification accuracy.

What is claimed is:

1. A graph feature extraction system based on adjacency matrix in a computer environment, wherein the graph feature extraction system extracts features of a graph based on adjacency matrix of the graph, wherein the features correspond to subgraphs structures which directly support classification; the features are presented in a form of at least one vector, each vector corresponding to a distribution of a mixed state in the graph; the graph feature extraction system comprises a connection information regulation module and a feature generation module, wherein: the connection information regulation module is configured to reorder all vertices in a first adjacency matrix of the graph to obtain a second adjacency matrix; and connection information elements in the second adjacency matrix are mainly distributed in a diagonal region with width of n, where n is a positive integer, n.gtoreq.2 and n<|V|, |V| is a number of rows or columns of the second adjacency matrix; the feature generation module generates the features of the graph based on the second adjacency matrix, and the features correspond to subgraph structures which support classification, and each vector corresponds to the distribution of the mixed state in the graph; the graphs and subgraphs are graphs in graph theory; the connection information element is the corresponding element of an edge of the graph in the adjacency matrix.

2. The system of claim 1, wherein the diagonal region refers to a diagonal region in the matrix from the upper left corner to the lower right corner.

3. The system of claim 1, wherein the distribution is the possibility that the subgraph structure in the mixed state appears in the graph.

4. The system of any one of claim 1, wherein each of the mixed states represents a linear weighting of the adjacency matrix corresponding to any of an arbitrary plurality of subgraph structures.

5. The system of claim 4, wherein the linear weighting refers to multiplying the adjacency matrix of each subgraph by the weight corresponding to the adjacency matrix, and then add bitwise together to obtain a matrix of the same size as the adjacency matrix of the subgraph.

6. The system of claim 1, wherein if there is no weight on the edge of the graph, the value of the connection information element is 1 and the value of the non-connection information element is 0.

7. The system of claim 1, wherein if the edge of the graph is weighted Then, the value of the connection information element is the edge weight value, and the value of the non-connection information element is 0.

8. The system of claim 1, wherein
the diagonal region of the second adjacency matrix is composed of the following elements: a positive integer i traverses from 1 to |V|; when i>max (n, |V|−n), the elements from column (i−n+1) to column |V| in the i-th row are selected; when i≤n, select elements from columns 0-th to column i+n−1th in the i-th row; when max(n,|V|−n)≥I≥min(|V|−n, n), select elements from column (i−n+1)-th column to column (i+n−1)-th in the i-th column.

9. The system of claim 8, wherein the diagonal region of the second adjacency matrix refers to a scanned area that is scanned diagonally by using a scanning rectangle with a size n×n.

10. The system of claim 9, wherein the scanning process is as follows: first, the upper left corner of the scanning rectangle is coincident with the upper left corner of the second adjacency matrix; then each time the scanning rectangle is moved to the right and the down by one grid, until the lower right corner of the scanning rectangle coincides with the lower right corner of the second adjacency matrix.

11. A graph feature extraction method based on adjacency matrix in a computer environment, wherein the method extracts features of a graph based on the adjacency matrix of the graph, and the features which correspond to subgraph structures directly support the classification, and the features are presented in a form of at least one vector, and each vector corresponds to a distribution of a mixed state in the graph; the method comprises the following steps:

(1) edge information regulation: reordering all the vertices in a first adjacency matrix to obtain a second adjacency matrix, and concentrating connection information elements in the second adjacency matrix into a diagonal region with width n, where n is a positive integer, n≥2 and n<|V|, |V| is the number of rows or columns of the second adjacency matrix; wherein the connection information element in the adjacency matrix is the corresponding element of an edge of the graph; and (2) diagonal filtering: based on the second adjacency matrix obtained in step (1), generating the features of the graph; wherein the features correspond to the subgraph structures which directly support the classification, and each vector corresponds to the distribution of the mixed state in the graph;

wherein the graphs and subgraphs are graphs in graph theory.

12. The method of claim 11, wherein the diagonal region refers to the diagonal region from the upper left corner to the lower right corner of the matrix.

13. The method of claim 11, wherein if there is no weight on the edge of the graph, the value of the connection information element is 1 and the value of the non-connection information element is 0.

14. The method of claim 11, wherein if the edge of the graph has weight, the value of the connection information element is the edge weight value, and the value of the non-connection information element is 0.

15. The method of claim 11, wherein the diagonal region of the second adjacency matrix is composed of the following elements: a positive integer i traverses from 1 to |V|, and when i>max(n, |V|−n), select elements from column (i−n+1) to |V| in i-th row; when i≤n, select elements from 0-th to i+n−1th columns in the i-th row; when max(n,|V|−n)≥I≥min (|V|−n,n), then select elements from (i−n+1)-th column to (i+n−1)-th column in the i-th column.

16. The method of claim 15, wherein the diagonal region of the second adjacency matrix refers to a scanned area that is scanned diagonally by using a scanning rectangle with a size n×n.

17. The method of claim 16, wherein the scanning process is described as follows: first, coinciding the upper left corner of the scanning rectangle with the upper left corner of the second adjacency matrix; then each time moving the scanning rectangle to the right and the down by one grid, until the lower right corner of the scanning rectangle coincides with the lower right corner of the second adjacency matrix.

18. The method of claim 16, wherein the edge information regularizing step of claim 11 reorders all the vertices of the first adjacency matrix, so that the concentration of connection information elements in the diagonal region of the second adjacency matrix after sorting is the highest.

19. The method of claim 18, wherein the reordering method is an integer optimization algorithm.

20. The method of claim 18, wherein the reordering method is a greedy algorithm and comprises the following steps:
  (1) initial input: inputting the first adjacency matrix of the input graph as pending adjacency matrix;
  (2) swap pairs calculation: calculating all possible vertex exchange pairs in the pending adjacency matrix;
  (3) row and column exchange: judging whether all possible vertex exchange pairs are in a processed state; if yes, outputting the pending adjacency matrix to obtain the second adjacency matrix, and the greedy algorithm ends; otherwise, selecting one vertex exchange pair as the current vertex exchange pair, and switching the corresponding two rows and two columns in the pending adjacent matrix to generate a new adjacency matrix and jump to Step (4); and
  (4) exchange evaluation: calculating the concentration of connection information elements in new adjacency matrix; if the concentration of connection information elements in the new adjacency matrix is higher than it in the pending adjacency matrix, accepting the exchange, and replacing the pending adjacency matrix with the adjacency matrix, and jumping to step (2); if the concentration of connection information elements in the new adjacency matrix is lower than or equal to it in the pending adjacency matrix, abandoning the exchange and marking the current vertex exchange pair as a processed state, and jumping the process to step (3).

* * * * *